(12) United States Patent
Edge et al.

(10) Patent No.: US 7,119,760 B2
(45) Date of Patent: Oct. 10, 2006

(54) COLOR IMAGE DISPLAY ACCURACY USING GREEN-LIMITED GAMMA ESTIMATE

(75) Inventors: Christopher J. Edge, Saint Paul, MN (US); Timothy A. Fischer, Mendota Heights, MN (US)

(73) Assignee: Kodak Graphic Communications Canada Company, Burnaby (CA)

( * ) Notice: Subject to any disclaimer, the term of this patent is extended or adjusted under 35 U.S.C. 154(b) by 847 days.

(21) Appl. No.: 09/778,486

(22) Filed: Feb. 7, 2001

(65) Prior Publication Data

Related U.S. Application Data

(63) Continuation-in-part of application No. 09/631,312, filed on Aug. 3, 2000.

(60) Provisional application No. 60/193,725, filed on Mar. 31, 2000, provisional application No. 60/246,890, filed on Nov. 8, 2000.

(51) Int. Cl.
G09G 5/00 (2006.01)

(52) U.S. Cl. .......................... 345/2.1; 345/72; 345/83; 345/88; 345/77; 345/589; 345/690

(58) Field of Classification Search ............... 345/2, 345/1, 72, 83, 87–88, 904, 2.1, 214, 589, 345/613, 77, 690; 358/500–502, 442, 518; 347/19, 115, 172, 188; 348/32, 183, 190–191, 348/177–179; 382/162, 167
See application file for complete search history.

(56) References Cited

U.S. PATENT DOCUMENTS

| | | | |
|---|---|---|---|
| 4,409,614 A | 10/1983 | Eichler et al. | |
| 4,808,984 A | * | 2/1989 | Trueblood et al. .......... 345/214 |
| 4,921,334 A | 5/1990 | Akodes | |
| 4,984,072 A | 1/1991 | Sandrew | |

(Continued)

FOREIGN PATENT DOCUMENTS

DE 195 183 21 A1 12/1995

(Continued)

OTHER PUBLICATIONS

"Why do Images Appear Darker on Some Displays? An Explanation of Monitor Gamma" by Robert ☐☐W. Berger, copyright 1997.*

(Continued)

Primary Examiner—Amr A. Awad
Assistant Examiner—Leonid Shapiro
(74) Attorney, Agent, or Firm—Mark G. Bocchetti

(57) ABSTRACT

Improved color image display accuracy can be achieved across a computer network by obtaining information characterizing the color response of display devices associated with a client residing on the computer network, and using the information to modify color images delivered to the client. The information may include a gamma estimate. In one embodiment, the gamma estimate is limited to only the green color channel, without reference to the gammas for the red and blue channels. In this manner, the gamma estimate concentrates on the most dominant color channel and avoids errors that can arise due to the red-blue imbalances that are highly prevalent in many display devices. The information can be obtained, for example, by guiding the client through a color profiling process that profiles the color response of the display device. For example, such guidance may take the form of a series of instructional web pages that are delivered to the client. The web pages can be made interactive to enable collection of color characterization data from the client.

41 Claims, 10 Drawing Sheets

U.S. PATENT DOCUMENTS

| | | | |
|---|---|---|---|
| 5,381,349 A | | 1/1995 | Winter et al. |
| 5,400,153 A | * | 3/1995 | Schonenberg et al. ...... 358/516 |
| 5,512,961 A | | 4/1996 | Cappels, Sr. |
| 5,553,200 A | | 9/1996 | Accad |
| 5,638,117 A | * | 6/1997 | Engeldrum et al. ......... 348/179 |
| 5,781,206 A | | 7/1998 | Edge |
| 5,874,988 A | * | 2/1999 | Gu .............................. 348/97 |
| 5,877,787 A | | 3/1999 | Edge |
| 5,910,796 A | | 6/1999 | Gormish |
| 6,008,836 A | | 12/1999 | Bruck et al. |
| 6,027,201 A | | 2/2000 | Edge |
| 6,043,894 A | * | 3/2000 | Van Aken et al. .......... 356/425 |
| 6,043,909 A | * | 3/2000 | Holub ........................ 358/504 |
| 6,084,564 A | | 7/2000 | Ohara et al. |
| 6,091,518 A | | 7/2000 | Anabuki |
| 6,185,005 B1 | * | 2/2001 | Yoo ............................ 358/1.9 |
| 6,198,545 B1 | | 3/2001 | Ostromoukhov et al. |
| 6,243,070 B1 | * | 6/2001 | Hill et al. ................... 345/589 |
| 6,342,896 B1 | * | 1/2002 | Shetter et al. .............. 345/589 |
| 6,343,147 B1 | | 1/2002 | Yamamoto |
| 6,349,300 B1 | * | 2/2002 | Graf et al. .................. 707/100 |
| 6,396,505 B1 | * | 5/2002 | Lui et al. .................... 345/613 |
| 6,429,868 B1 | | 8/2002 | Dehner, Jr. et al. |
| 6,439,722 B1 | * | 8/2002 | Seegers et al. ............. 351/243 |
| 6,476,824 B1 | | 11/2002 | Suzuki et al. |
| 2001/0014174 A1 | | 8/2001 | Yamamoto |
| 2001/0043376 A1 | | 11/2001 | Kumada et al. |
| 2001/0053248 A1 | | 12/2001 | Maeda |
| 2002/0015044 A1 | * | 2/2002 | Edge et al. ................. 345/600 |
| 2002/0093476 A1 | | 7/2002 | Hill et al. |

FOREIGN PATENT DOCUMENTS

| | | |
|---|---|---|
| JP | 10-224643 | 8/1998 |
| JP | 2000-083123 | 3/2000 |
| WO | WO 95/17071 | 6/1995 |
| WO | WO 98/15091 | 4/1998 |
| WO | WO 99/56088 | 11/1999 |
| WO | WO 00/29935 | 5/2000 |

OTHER PUBLICATIONS

Elaine Weinmann, Peter Lourekas, Photoshop of windows, 1996, Visual QuickStart Guide.*

Adobe Gamma Display Calibrator, Version 3.0, 1998.

E-Color, Inc. Brochure, "True Internet Color Assures Online Color Accuracy For e-Commerce Applications," 10 pgs., no date available.

Fox et al., *Computer Networks and ISDN Systems*, 1996, 28(7-11):1445-1456.

Praxisoft Brochure, entitled "Introducing REALNETCOLOR™", no date available.

Praxisoft: Color Matching Solutions—Internet Solutions—REALNETCOLOR™, no date available.

Press Release—True Internet Color Patent Filings—in True Internet Color(r), E-Color, Incorporated, Apr. 2000.

Photo CD Information Bulletin, "Fully Utilizing Photo CD Images Using Information Beyond 100% White", Jul. 1993, pp. 1-6.

Photo CD Information Bulletin, "Fully Utilizing Photo CD Images Adjusting the Balance of Photo CD Images", Jul. 1993, pp. 1-5.

Rafael C. Gonzalez and Richard E. Woods, "Digital Image Processing," 1992, pp. 190-213.

Chiang S. Jao et al., "The Display of Photographic-Quality Images on the Web: A Comparison of Two Technologies," IEEE Transactions on Information Technology in Biomedicine, vol. 3, No. 1, Mar. 1999.

Hans Brettel, "Display Gamma Estimation Applet," http://www.tsi.enst.fr/~brettel/TESTS/Gamma/Gamma.html, Applet 1999, 1 pg.

Robert W. Berger, "Why Do Images Appear Darker on Some Displays? An Explanation of Monitor Gamma," http://www.bberger.net/rwb/gamma.html, 1997, 4 pgs.

Elaine Weinmann and Peter Lourekas, "Photoshop of Windows 3," Peachpit Press, Copyright 1996, pp. 15, 122, 252 and 256.

* cited by examiner

1. SET CONTRAST AND BRIGHTNESS TO MAX

2. REDUCE BRIGHTNESS UNTIL DARKEST ROW IS BARELY VISIBLE

3. THEN CLICK 'NEXT'

3 3 3 3 3 3 3     ANALOG ADJUSTMENT 2 2 2 2 2 2 2

122 —

1 1 1 1 1 1 1

NEXT
124 — 0 0 0 0 0 0 0

SELECT ROW THAT IS BARELY VISIBLE 3 3 3 3 3 3 3     RED CHANNEL BLACKPOINT 2 2 2 2 2 2 2

COLOR IMAGE DISPLAY ACCURACY USING GREEN-LIMITED GAMMA ESTIMATE

This application is a continuation-in-part of U.S. application Ser No. 09/631,312, filed Aug. 3, 2000, and claims priority from U.S. provisional application Ser. No. 60/193,725, filed Mar. 31, 2000, and U.S. provisional application Ser. No. 60/246,890, filed Nov. 8, 2000, the entire content of each being incorporated herein by reference.

TECHNICAL FIELD

The invention relates to color imaging and, more particularly, to presentation of color images on display devices.

BACKGROUND

The growth of the Internet has created sizable opportunities for online retailers. Most major retailers of consumer products have established commercial sites on the World Wide Web. At the same time, the availability of website presence has eliminated many of the marketing barriers previously experienced by smaller retailers. Virtually any retailer can now post product information for easy access by potential customers, and take orders for products in an automated fashion.

The product information may include a large number of images. The images enable web customers situated at client devices to view products before submitting an online purchase order. For some items, the user is permitted to click on a "thumbnail" image to view the item in a higher resolution format. For many retailers, however, the quality of the images can be a significant concern. Color accuracy, in particular, can be very important for retailers of products for which color matters.

In the case of clothing retailers, for example, an image of a sweater should match its actual color as closely as possible. Unfortunately, the color output characteristics of different display devices can differ significantly. A cathode ray tube (CRT) or flat panel display, video card, driver software, and operating system together determine how RGB pixel values will be rendered and displayed, and vary significantly from system to system.

Consequently, an online customer may order what appears to be a burgundy sweater but instead receive a bright red sweater. Indeed, color inaccuracy has become a significant cause for return of merchandise purchased by online customers. In some cases, this problem can erase the advantages obtained by the retailer's commitment to online merchandising, and undermine continued investment.

SUMMARY

The invention relates to improvement of color image display accuracy among display devices with different color output characteristics.

The invention, in one embodiment, makes use of a green-limited gamma estimate. Gamma is an estimate of the overall display device gamma, which aids in colorimetric characterization of the display device. The gamma determination is initially determined based on the green color channel of the display device only, without reference to the red and blue channels.

Green is the most dominant and intense phosphor among red, green, and blue, and is highest in contrast. Green also has the highest L* (in the L*a*b* color space), and most closely matches the photopic V($\lambda$) response of the eye. This approach to obtaining an initial RGB average gamma determination considers only the green color channel, and essentially ignores red and blue. In this sense, the initial gamma determination is "green-limited," i.e., limited to the green channel.

The green-limited gamma measurement concentrates on the most dominant color channel and avoids errors that can arise due to the red-blue imbalances that are highly prevalent in many display devices. Thus, the elements displayed for the gamma determination may be green patches with different darkness or lightness values. The elements may be displayed against a green dithered background. Limiting the gamma determination to the green channel simplifies the user's selection process, and can reduce the likelihood of user error.

The gamma determination may involve a coarse gamma estimate, followed by a fine gamma estimate. The coarse gamma estimate may serve as a first estimate for a subsequent step of gamma determination. The subsequent step fine-tunes the initial gamma estimate to form a more accurate colorimetric characterization of the gamma of the display device.

The green-limited gamma estimate may be determined in conjunction with a blackpoint estimate and a gray balance estimate for the display device. Together, the blackpoint, gamma, and gray balance characterize the colorimetric response of the display device.

In some embodiments, the green patch selected for the coarse gamma measurement is used as a central green patch among a range of green patches used to measure the fine gamma. The gamma associated with the green patch selected for the fine gamma estimate then can be used to form a central gray patch among a range of gray patches for a gray balance determination. The term "gray," as used herein, generally refers to a color formed by combinations of two or more color channels of various gray levels, in contrast to colors formed by single color channels.

In particular, a central gray patch can be displayed against a gray dithered background among a range of gray patches. The range of gray patches represent shifts away from the gamma indicated by the green patch along the red and blue axes. The central gray patch has equal amounts of red, green, and blue that correspond to the value of the initial fine gamma estimate. Every gray patch has the same green value but different red and blue values. This step eliminates one axis of variation, green, but facilitates identification of imbalance between red and blue. This limits the range of choices to a more finely-tuned area, and aids the user in making a more accurate selection.

Thus, in many circumstances, a more accurate colorimetric characterization can be obtained using a green-limited gamma estimate. This enables greater accuracy in a process for modification of color images that are delivered to, and displayed on, a particular display device. In this manner, the invention can provide improved color image display accuracy.

Improved color image display accuracy can be achieved, for example, by obtaining the green-limited gamma estimate and the other information characterizing the color response of a display device associated with a client device residing on a computer network such as the World Wide Web. The information can be used advantageously to modify color images delivered to the client from a server.

In particular, the invention, in various embodiments, may be applied to provide color image modifications that compensate for the color response of the individual display device associated with the client. The display device may take the form of a cathode ray tube monitor, flat panel display, or similar color image display device.

The green-limited gamma estimate and additional information can be obtained, for example, by guiding the client through a color profiling process that profiles the color response of the display device. Guidance may take the form of a series of instructional web pages that are delivered to the client via the computer network.

The web pages can be made interactive to enable collection of color characterization data from the client. The color characterization data can be used to estimate a variety of information concerning display device characteristics such as the blackpoint estimate, gamma, gray balance, and the like.

Once the information has been collected, a color profile can be created for the client's display device, and thereafter used for modification of color images delivered to the client. The color profile can be incorporated in information that is transmitted by the client to an image server for modification of color images to be delivered to the client. The information transmitted by the client can be embodied in a web cookie or other information container.

A cookie, or alternative container, can provide a persistent representation of the color response characteristics of the client's display device. Each time the client accesses a web server and color images are identified in web page content, the cookie can be sent to the appropriate image server to improve the accuracy of the color image displayed on the client's display device. The cookie may contain a computed color profile for a display device or parameters useful in computing such a color profile and thereby rendering color modifications, or "corrections," to images provided to a client.

With improved color image accuracy, the images viewed by the client appear as intended. The invention is capable of providing accurate characterization of a display device, while affording reliability and ease of use for the user. In a retail context, for example, the color of an item of interest more closely matches the actual color. As a result, items ordered by online customers are less likely to be returned based on color mismatch. Online retailers suffer from less returns, and online customers can shop with greater confidence that the items they order will arrive in the expected color.

In general, users viewing online images are able to see the colors intended by the original source without the need for significant adjustments to the display device. Improved color image accuracy can thereby enhance the online experience for the client. At the same time, in many embodiments, the user need not be burdened with downloadable plug-ins, client side scripts, and the like, which can consume time and precious attention span. Instead, in more preferred embodiments, the color profiling process can be carried out by a series of web pages.

In one embodiment, the invention provides a method comprising estimating a gamma for a display device based on selection of a displayed green element that appears to most closely blend with a dithered green background, characterizing overall gamma for red, blue, and green channels of the display device based on the estimated gamma, and modifying the overall gamma based on a gray balance evaluation for the red and blue color channels.

In an additional embodiment, the invention provides a computer-readable medium containing instructions to cause a programmable processor to estimate a gamma for the display device based on selection of a displayed green element that appears to most closely blend with a dithered green background, characterize overall gamma for red, blue, and green channels of the display device based on the estimated gamma, and modify the overall gamma based on a gray balance evaluation for the red and blue color channels.

In another embodiment, the invention provides a system comprising a web server to transmit web pages to clients residing on a computer network. A color image server transmits color images referenced by the web pages to the clients for display on display devices associated with the clients. A color profile server guides the clients through a color profiling process and obtains information characterizing the color responses of the display devices associated with the clients. The information includes an initial gamma for the display device. The initial gamma is determined based on selection of a displayed green element that appears to most closely blend with a dithered green background. The information also includes an overall gamma for red, blue, and green channels of the display device that is determined from on modification of the initial gamma based on a gray balance evaluation for the red and blue color channels. One or more color correction modules modify the color images transmitted by the color image server based on the information to improve the accuracy of the color images when displayed on the respective display device.

The details of one or more embodiments of the present invention are set forth in the accompanying drawings and the description below. Other features, objects, and advantages of the present invention will be apparent from the description and drawings, and from the claims.

BRIEF DESCRIPTION OF THE DRAWINGS

FIG. 6 is a diagram of a web page for analog adjustment of a color display prior to blackpoint determination;

FIG. 7 is a diagram of a web page for determination of blackpoint for a particular color channel;

DETAILED DESCRIPTION

Figure 1:
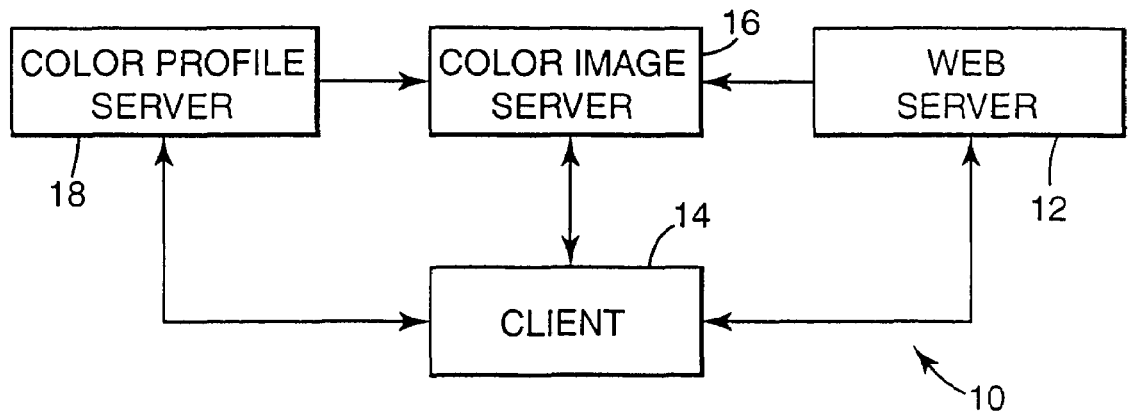
FIG. 1 is a block diagram of a system for improving color image display accuracy in a computer network.

FIG. 1 is a block diagram of a system 10 for improving color image display accuracy across a computer network. The computer network may take the form of a local area network, wide area network, or global computer network such as the World Wide Web. In accordance with one embodiment, system 10 may be configured to obtain an initial green-limited gamma estimate that assists in characterizing the colorimetric response of a display device associated with a client on the network. In particular, the initial gamma estimate is limited in the sense that it is based on only the green color channel, without reference to the gammas for the red and blue channels.

As shown in FIG. 1, system 10 may include a web server 12, a client 14, a color image server 16, and a color profile server 18. Web server 12 provides client 14 with access to one or more web pages incorporating graphic content such as color images. Some of the color images can be incorporated in the web pages stored at web server 12 while other color images can be stored at color image server 16. Web server 12 may store lower resolution color images, for example, as well as images that are less color-intensive. Higher resolution color images and more color-intensive images can be stored at color image server 16.

Web server 12, client 14, color image server 16, and color profile server 18 each execute instructions in the form of program code that is stored on computer-readable media residing locally with the respective device or executed remotely. For client 14, for example, the program code may reside in random access memory (RAM) that is accessed and executed by the client computer. The program code can be loaded into the memory from another memory device, such as a fixed hard drive or removable media device associated with client 14.

In particular, the program code can be initially carried on computer-readable media such as magnetic, optical, magneto-optic or other disk or tape media, or electronic media such as EEPROM. Alternatively, the program code can be loaded into the medium by transmission from a remote data archive, e.g., via a local area network, wide area network, or global network such as the Internet. A substantial portion of the code may be web page code that is transmitted to the respective device and executed by a server or browser application.

The web pages generated by web server 12 may comprise a variety of code, e.g., Hypertext Markup Language (HTML), Extensible Markup Language (XML), or the like, and may include image tags that point to specific color images stored at color image server 16 or elsewhere. When client 14 accesses a particular web page delivered by web server 12 and assembles the page content according to the HTML, client 14 may access color image server 16 to obtain any images tagged within the web page.

Thus, the content of a web page assembled for client 14 may include objects obtained from different resources within the network occupied by system 10, such as web server 12 and color image server 16. In some embodiments, web server 12 and color image server 16 may be integrated with one another. In the example of FIG. 1, however, color image server 16 and web server 12 are separate entities. Web server 12 and color image server 16 each may interact with a database server and file server to obtain access to selected color images for delivery to client 14.

Client 14 may take the form of a variety of devices that permit a user to access resources on system 10 and display color images obtained from such resources. Examples of client 14 include desktop or portable computers operating in a Windows, Macintosh, Unix, or Linux environment, personal digital assistants (PDA's), based on the Palm, Windows CE, or similar operating system environments for small portable devices, Internet-equipped wireless telephones, interactive televisions with set-top boxes for Internet access, Internet kiosks available to the general public, and future Internet appliances that may emerge.

Each client 14 preferably executes a graphical viewing application such as a web browser to access resources residing on other resources, such as web server 12 and color image server 16, attached to system 10. A web browser application permits the user associated with client 14 to readily view web pages generated by web server 12, and images served by color image server 16. Other user interface applications may be useful in accessing web server 12 provided the information is presented in a user-interactive format.

In some embodiments, color image server 16 may be configured to deliver color corrected video imagery, in addition to static images. Video, such as MPEG clips, streaming video, and the like may suffer from similar color accuracy issues if they are not compensated for the effects of the display device associated with an individual client 14. Thus, some embodiments of the invention may be particularly useful for broadcast-like video content.

In each case, client 14 includes a display device, such as a cathode ray tube or flat panel display, for display of color images obtained from web server 12 and color image server 16. Other types of displays, as well as dynamic viewing media such as electronic paper, are contemplated. Communication between web server 12, client 14, and color image server 16 may take place using conventional network protocols such as TCP/IP. Although some of the client devices described above, such as PDA's and wireless telephones, presently incorporate relatively low quality color displays, it is anticipated that such devices will benefit from higher quality color displays in the near future. Accordingly, system 10 will be readily applicable in enhancing the quality of color images displayed by PDA's, wireless telephones, and similar devices in the future.

As an illustration, web server 12 may deliver web pages associated with an online retailer such as a clothing merchandiser. In this example, the web pages delivered by web server 12 may contain information concerning an array of items offered for sale by the retailer, as well as color images of the items for viewing by online customers. Some of the color images may constitute low resolution "thumbnail" images placed coincident with hypertext links to higher resolution images stored at color image server 16. Client 14 executes the code delivered by web server 12 within a browser application to assemble a web page for display on a display device associated with the client.

When a user associated with client 14 clicks on one of the thumbnail images with a pointing device, such as mouse, trackball, pen, or the like, client 14 accesses color image server 16 to obtain the higher resolution color image designated by an image tag embedded in the web page code. To permit display of the higher resolution color image with greater color accuracy, color image server 16 modifies the color image based on information obtained for client 14. In particular, color image server 16 obtains information characterizing the color response of a display device associated with client 14.

The information can be uploaded to color image server 16, e.g., in the form of a web cookie or other content container. Alternatively, the information can be transmitted, i.e., broadcasted, to a number of subscriber color image servers in system 10, which are recognized by color profile server 18. The information can be generated by guiding a user associated with client 14 through a color profiling process that profiles the color response of the display device.

When client 14 accesses a color image from color image server 16, the user may be given a choice between viewing a version of the image with default color settings, or initiating the color profiling process to produce custom color settings for the user's display device and thereby improve the quality of the color image. In particular, the color image delivered by color image server 16 may be embedded in a web page with one or more hypertext links for initiation of the color profiling process through interaction with color profile server 18. When the user clicks on the hypertext link, client 14 accesses color profile server 18 for delivery of a series of instructional web pages to the user.

The instructional web pages provided by color profile server 18 guide the user through a number of steps designed to estimate the color response characteristics of the particular display device associated with client 14. When the process is complete, color profile server 18 delivers a web page with content that, when executed, generates a cookie containing the color profile information. The cookie then can be uploaded to color image server 16 for use in modifying the color image, and subsequently accessed color images, to produce higher quality color output on the display device associated with client 14. Exemplary color profiling processes will be described in greater detail later in this detailed description.

Other techniques for obtaining the color profiling information may not require direct interaction by the user with a color image server 16a–16n. Instead, the user may voluntarily visit a web site to perform color profiling. The web site may be provided by color profile server 18 or be within the same domain as the color profile server. Alternatively, users may profile the display devices associated with their individual clients 14a–14n by executing software downloaded or physically delivered to them. Moreover, display devices could be configured to produce a color profile when put in use, and transmit the color profile to subscriber color image servers, e.g., in a cookie. In each case, color profile server 18 receives essentially the same information for transfer to a number of individual color image servers for delivery of color corrected images to client 14.

Figure 2:
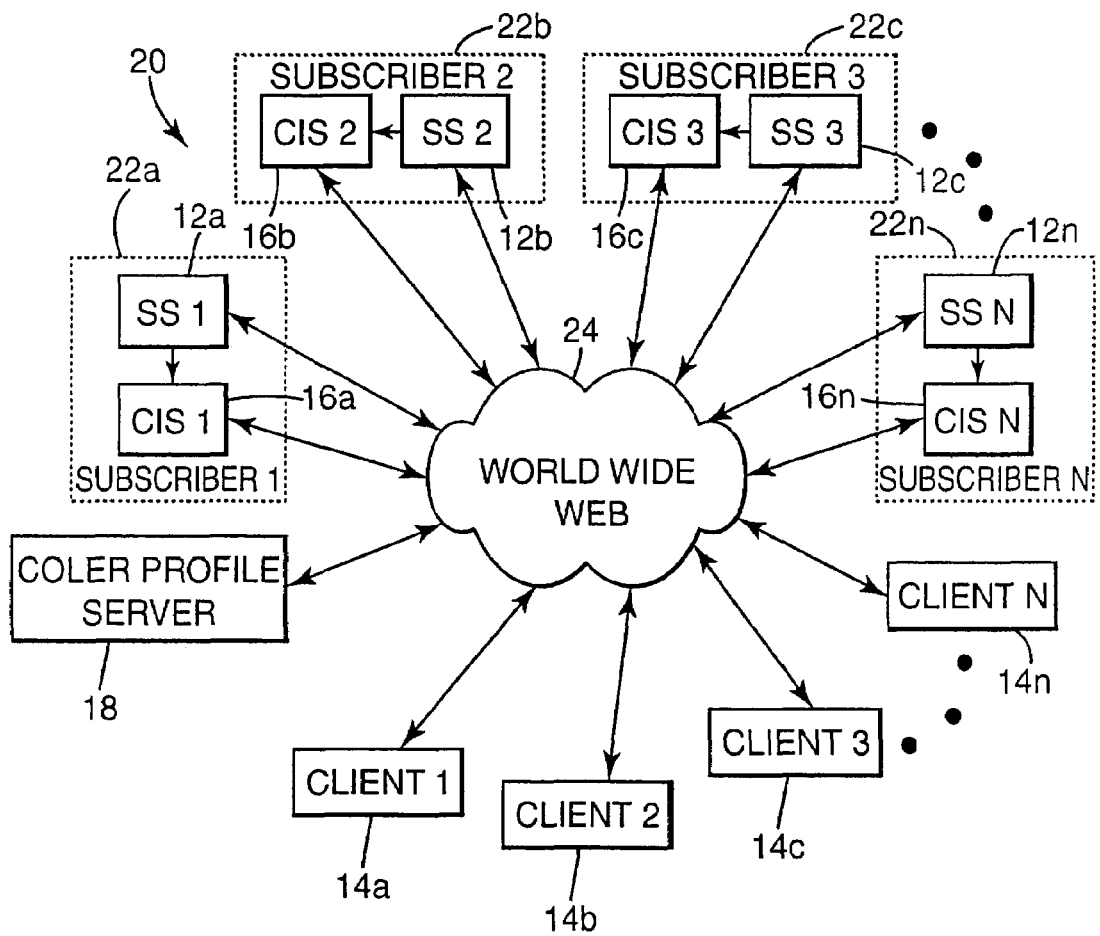
FIG. 2 is a block diagram of a web-based environment incorporating a system as shown in FIG. 1.

FIG. 2 is a block diagram of a web-based environment 20 incorporating a system as shown in FIG. 1. Web-based environment 20 includes a number of subscribers 22a, 22b, and 22c–22n, each of which may represent a commercial retailer with an online merchandising web site Of course, subscribers 22a–22n may include non-commercial entities as well, such as art museums and the like. For each subscriber 22a, 22b, and 22c–,22n, a subscriber web server, or "subscriber server" ($SS_1$–$SS_N$) 12a, 12b, and 12c–12n, delivers web pages with content describing the subscriber's merchandise, and a color image server ($CIS_1$–$CIS_N$) 16a, 16b, and 16c–16n delivers high quality color images that may be modified based on color profiles generated for individual clients 14a, 14b, and 14c–14n. Thus, each of subscribers 22a–22n posts its high quality color images to a respective color image server 16a–16n, and maintains web pages that invoke the high quality images at a respective subscriber server 12a–12n. Note that there may be many more clients 14a–14n than subscribers 22a–22n.

One of the subscriber servers 12a–12n and one of the color image servers 16a–16n are typically under the control of the respective subscriber. In other words, subscriber 22a may be responsible for maintenance, administration, and content of subscriber server 12a and color image server 16a, while subscriber 22b is responsible for subscriber server 12b and color image server 16b. In this manner, subscribers 22a–22n can readily update the contents of subscriber servers 12a–12n and color image servers 16a–16n themselves. Consequently, subscribers 22a–22n do not need to relinquish control of their image content to some third party in order to take advantage of the color image quality improvements contemplated in accordance with this embodiment of the invention.

Instead, subscribers 22a–22n make use of their own color image servers 16a–16b and interaction with a color profile server 18 that guides the color profiling process for clients 14a–14n. Nevertheless, in some embodiments, use of a central image server for all subscribers may be desirable. The commercial entities associated with subscriber servers 12a–12b and color image servers 16a–16n are "subscribers" in the sense that they all make use of color profiles generated by interaction with one or more common color profile servers 18. Thus, a subscriber may be a retailer or collection of retailers with a web site that employs color correction as described herein, and makes use of color profile server 18.

Subscriber server 12a–12n may be the subscriber's main web server. Color image server 16a–16n can be a server that is co-located with or remotely located from a corresponding subscriber server 12a–12n and contains the subscriber's high resolution or color-intensive color images and a color correction module for modifying the images and serving corrected images to clients 14a–14n. Each color image server 16a–16n may be within the domain of the respective subscriber server 12a–12n, but this is not a requirement. Thus, in the environment of FIG. 2, clients 14a–14n are potential customers of subscribers 22a–22n who view the subscriber's web pages with their own browsers.

Clients 14a–14n access subscriber servers 12a–12n, color image servers 16a–16n, and color profile server 18 via a computer network such as World Wide Web 24. Although the number of clients 14a–14n and subscribers 22a–22n shown in FIG. 1 is limited for ease of illustration, the actual number can be virtually unlimited subject to the bandwidth limitations of subscriber servers 12a–12n, color image servers 16a–16n, color profile servers 18 and web 24.

With a large number of clients 14a–14n accessing subscribers 22a–22n, the color responses of individual display devices can be quite varied. The color profiling process and color image modifications administered by color profile server 18 and color image servers 16a–16n, however, compensate for differences between the various client display devices and thereby increase the consistency of color output viewed by users situated across web 24. If subscribers 22a–22n are clothing retailers, for example, the color images viewed by clients 14a–14n on disparate display devices can be made to more closely match the color of actual clothing items.

Figure 3:
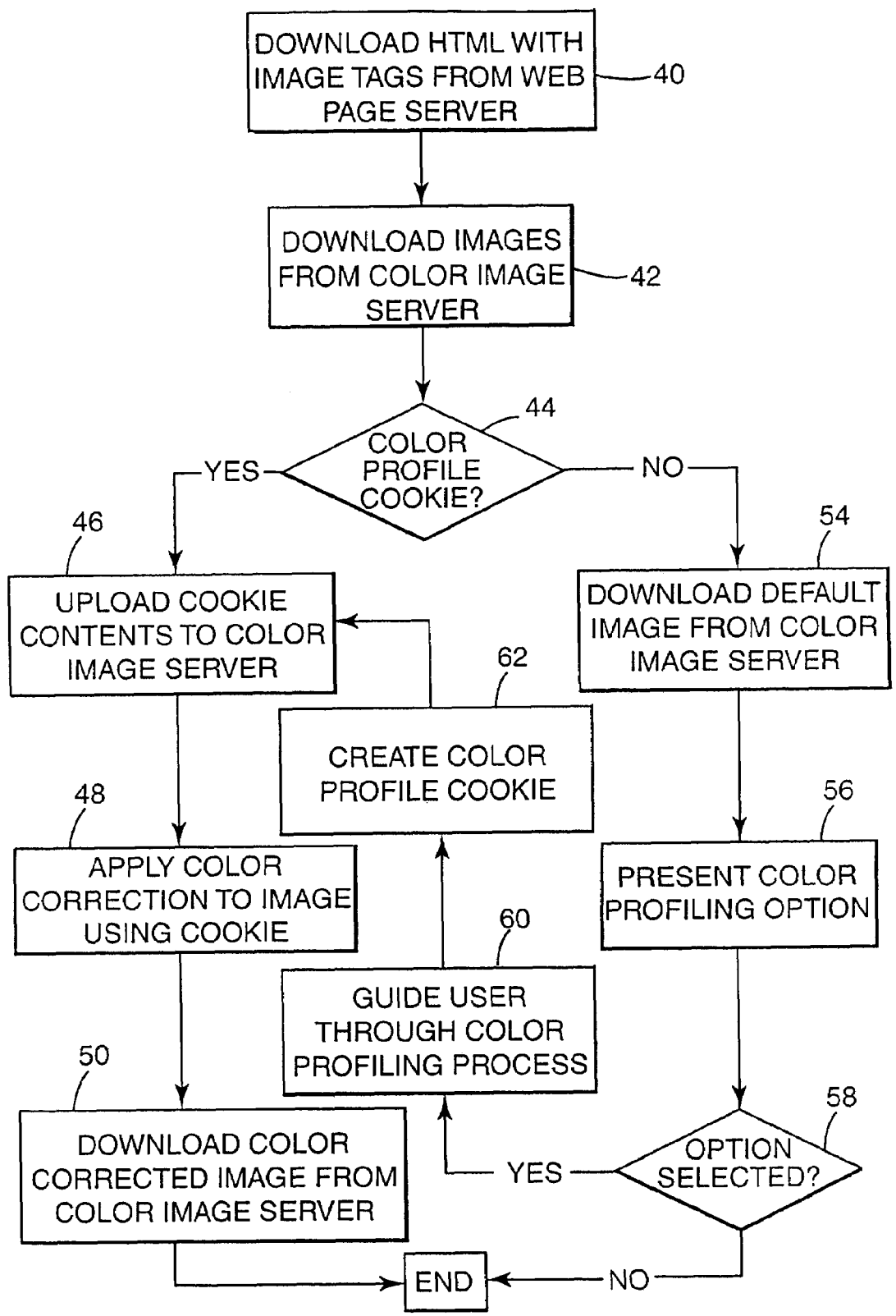
FIG. 3 is a flow diagram illustrating a method for improving color image display accuracy in a computer network.

FIG. 3 is a flow diagram illustrating a method for improving color image display accuracy in a computer network as shown in FIGS. 1 and 2. When a client 14 seeks to download a web page from a subscriber server 12, the client receives HTML code (or some other form of web page code) with embedded image tags identifying the locations of color images to be incorporated in the web page when it is presented on a display device (40). For lower resolution images, such as so-called "thumbnails," the image tags may point to locations resident at subscriber server 12. When a user clicks on a thumbnail to access a higher resolution image, or when a higher resolution is embedded in the web page in the first instance, client 14 accesses and downloads a corresponding color image from a designated color image server 16 (42).

In the example of FIG. 3, client 14 queries whether a color profile cookie visible to the color image server has been generated for the particular client (44). A cookie is visible, for example, if it corresponds to the domain of color image server 16. Management of cookies will be described later in this description. The color profile cookie contains information characterizing the color response of the display device associated with client 14, and typically resides locally with the client. If a color profile cookie has been generated, client 14 uploads the cookie to color image server 16 (46).

Color image server 18 retrieves the image requested by client 14 and modifies the image based on the contents of the cookie by applying a color correction (48). The color correction modifies the image to compensate for variations in the color response characteristics of the display device associated with client 14. Color image server 16 then downloads the color corrected image to client 14 (50) and the process ends (52) In the above manner, client 14 receives a color corrected image that is customized for the client's display device to provide more accurate color output.

If a color profile cookie has not been generated previously, client 14 downloads a default color image from color image server 16 (54) for presentation on the display device associated with the client. The image is a "default" image in the sense that it has not been color corrected or otherwise customized for the individual display devices associated with client 14. As a result, when displayed by client 14, the default image may exhibit significant color inaccuracy relative to the original color image. With the default image, however, client 14 may present a color profiling option (56).

In particular, client 14 may download with the image an indication of whether color profiling and correction has been applied to the image. With the image, client 14 may display that indication along with a hypertext icon that may invite the user to carry out color profiling. The user may click on the profiling icon with a pointing device to access the color profiling process. In some embodiments, the profiling icon may indicate that profiling has already been performed and that the image has been color corrected, e.g., by displaying the icon in color. If profiling has not been performed previously, the icon may be displayed in black-and-white or some other indication can be provided. By clicking on the icon, the user can commence profiling, either in the first instance or as a profiling update If the option is not selected (58), the user simply views the default image and the process ends (52). If the option is selected, however, client 14 accesses color profile server 18, e.g., via the hypertext link associated with the icon. Color profile server 18 guides the user associated with client 14 through a color profiling process (60). The color profiling process produces information characterizing the color response exhibited by the display device associated with the particular client 14.

Following completion of the color profiling process, client 14 generates a color profile cookie (62). The color profile cookie contains the color characterization information. Client 14 then uploads the color profile cookie to color image server 16 (46) to obtain a color corrected image for improved color image accuracy. As will be explained, the cookie may need to be rewritten for the domain of color image server 16.

Notably, as will be described, the color profiling process optionally requires no plug-ins, Java scripts, or other significant client-side processes. Instead, interaction between subscriber server 12, client 14, color image server 16, and color profile server 18 is driven by a series of web pages delivered to client 14. This approach yields significant convenience for the end user associated with client 14. At the same time, subscribers 22 are not required to retain color information for individual users.

Rather, the information can be uploaded to color image server 16, e.g., in the form of a cookie, whenever color images are requested by a client 14. Moreover, subscribers 22 can maintain their own color images at color image servers 16, and provide color correction by incorporating a color correction module capable of handling the color profile cookies uploaded by individual clients 14. Accordingly, there is no need for subscribers 22 to post their web pages or images to a central web repository.

To carry out a color profiling process as described with reference to FIG. 3, client 14 interacts with color profile server 18. Color profile server 18 delivers a series of web pages to client 14. Each of the web pages is designed to guide the user through a given step in the color profiling process. One web page, for example, may include instructions and image content designed to extract from the user an estimate of the blackpoint of the display device. In one embodiment, the blackpoint estimate may be an estimate of multiple, channel-specific blackpoints. Other web pages may include instructions and content designed to extract coarse gamma, fine gamma, and gray balance information. In particular, each web page may include interactive media such as hypertext icons and the like that can be clicked upon by the user to transfer information from client 14 to color profile server 18.

Upon collecting the necessary information, color profile server 18 creates the cookie and delivers it to client 14 for local storage and future use. In some embodiments, two cookies can be provided to client 14. A first cookie may correspond to a domain name associated with color profile server 18, and be used for future interaction between the particular client 14 and the color profile server. The first cookie can be referred to as the "profiler cookie."

A second cookie may correspond to a domain name associated with the particular color image server 16 (corresponding to a particular subscriber such as a retailer) from which the color image is to be downloaded. In other words, the second cookie may correspond to the color image server 16 at which the color profiling process was initiated. In this manner, future images delivered by that color image server 16 will be modified based on the contents of the cookie associated with the pertinent domain. The second cookie can be referred to as the "subscriber cookie."

The profiler cookie can be used to produce additional subscriber cookies for use with color image servers 16 associated with other domains. Specifically, when a user situated at a client 14 accesses a color image server 16 from which the user has not previously downloaded color corrected images, the user can click on the color profiling option and be directed to color profile server 18. Upon interaction with color profile server 18, client 14 simply uploads the profiler cookie instead of repeating the color profiling process. Information concerning the domain associated with the new color image server 16 can be incorporated in the profiler cookie.

In response to receipt of the profiler cookie, color profile server 18 delivers a web page advising the user associated with client 14 of the intent to send the cookie contents to the domain indicated in the cookie, and may request user approval for, among other reasons, privacy concerns. Upon approval by the users, color profile server 18 transmits the cookie contents to the color image server 16 designated by the domain in the profiler cookie. In response, the color image server 16 creates a subscriber cookie for its own domain, and writes the cookie to client 14 for future use. Thereafter, client 14 uploads the appropriate subscriber cookie to the pertinent color image server 16 when requesting color corrected images for the pertinent subscriber 22, and can bypass interaction with color profile server 18.

The reliance on first and second cookies, one for color profile server 18 and the other for a particular subscriber server 12a–12n or color image server 16, is driven in part by existing web design considerations. In particular, cookies stored on a client's browser typically are marked by the domain of the server that generates them, and are not generally visible to other domains. Thus, cookies created by color profile server 18 are not generally visible to color image servers 16, and vice versa.

Cookie visibility can be further restricted by marking the cookie with a path within a server's domain. This sort of cookie will then not be visible on requests to pages outside the path, even if to the same domain Further, a browser routinely sends all visible cookies on each request to a server. This includes not only the initial request for an HTML page, but also the requests for images to be embedded in the page. Because an image can come from a different server than the HTML page, however, the cookies sent for the HTML page can differ from those sent for the image.

In light of the above considerations, color profile server 18 acts as an intermediary not only for administration of the color profiling process, but for generation of subscriber cookies. This intermediary function enables color correction of all subscriber images to be performed at color image servers 16 rather than at a centralized site. Also, with this intermediary function, once a client has gone through the color profiling process, he generally will not have to repeat it to obtain color correction of images for additional subscribers. As an exception, the user may voluntarily repeat the color profiling process when local driver software or hardware such as the display device or video card associated with a client 14 has changed. Indeed, to encourage updates from time to time in order to accommodate hardware changes, expiration dates can be applied to the profiler cookie and subscriber cookies.

The three different servers, i.e., subscriber server 12, color image server 16, and color profile server 18, divide the labor involved in color correction transactions. In particular, assuming the existence of a profiler cookie and a subscriber cookie, a subscriber server 12 serves the HTML for the subscriber's own web pages and handles most other requests for those pages, including serving of images that are not subject to color correction. Color image server 16 serves the images that are subject to color correction.

If color image server 16 receives the appropriate subscriber cookie, it performs color correction based on the cookie contents and serves the color corrected image to the appropriate client device 14. Color image server 16 also may serve an icon near the correctable color images that indicates whether the color images have indeed been corrected. If color image server 16 finds no subscriber cookie, for example, it displays an icon suggesting that the user click the icon to initiate the color profiling process. Otherwise, the icon merely indicates that color correction is turned "on," i.e., that color correction has been applied to the image.

Color profile server 18, as mentioned above, serves the pages for the color profiling process. If the color profiling process is invoked by clicking the icon displayed with a color image delivered by color image server 16, the respective client 14 probably does not have a subscriber cookie for the pertinent subscriber 22. In some cases, however, client 14 may be voluntarily repeating the color correction process to update the profile for new hardware or software. If a profiler cookie exists, then the process can be abbreviated by simply shipping the contents of the cookie to the appropriate subscriber domain for creation of the subscriber cookie.

If the profiler cookie does not exist, then the full color profiling process is served by color profile server 18. Upon completion of the color profiling process, color profile server 18 generates the profiler cookie for client 14, and passes the contents of the profiler cookie to the pertinent color image server 16. Color image server 16 then generates the subscriber cookie based on the profiler cookie contents and invokes the original subscriber URL from which the color profiling process was invoked.

The mechanisms for exchanging color correction information between the profiler cookie generated by color profile server 18 and the subscription cookie generated by color image server 16 may vary. In particular, rather than delivering cookies to clients 14, color profile server 18 may be arranged to transmit the color correction information to all of the color image servers 16 associated with a recognized group of subscribers 22.

In this manner, the color profile information obtained by color profile server 18 as a result of the color profiling process can be "broadcasted" for storage by subscribers 22. The advantage of this approach is that information transfer is seamless. There is no need for the user associated with a client 14 to interact with color profile server 18 following the initial color profiling process, other than to update the color profile. Rather, each subscriber 22 stores the color correction information associated with the individual client 14, e.g., with a client ID code.

When the client 14 accesses one of the color image servers 16, the client ID code is used to retrieve the appropriate color correction information and thereby serve a color corrected image. The downside is that each subscriber 22 needs to maintain a database of color correction information for clients 14 requesting color corrected images from the participating subscribers, including clients who may never access a respective subscriber server 12. Thus, an approach that makes use of cookies for transfer of color correction information may be more desirable for some subscribers 22. Nevertheless, broadcasting of color correction information remains a viable option that may be acceptable to some subscribers 22, and highly convenient for end users.

The following is a description of some of the details that may be associated with passing information between subscriber servers 12, clients 14, color image servers 16, and color profile server 18 according to an indirect cookie transfer approach. This approach is indirect in the sense that the user intervenes and enters approval before the profiler cookie contents are transferred from color profile server 18 to a respective color image server 16. In delivering web pages to clients 14, subscriber servers 12 pass the URL's for correctable images stored on associated color image servers 16. In addition, subscriber servers 12 preferably incorporate color profiling icons near the images. The URL's for the color profiling icons point to the pertinent color image server 16, while the hypertext link associated with the icon points to color profile server 18.

To accomplish passing of color correction information back to color image server 16, the URL of the page viewed by the user is passed to color profile server 18 when the hypertext link associated with the icon is followed by a client 14. This step of passing the URL can be accomplished either by including the URL as a parameter on the target URL, or by POSTing the information from a form that wraps the icon, i.e., with the URL stored in a hidden entry field. In the latter case, the icon serves as a button, which may require some minimal client-side scripting. In addition, as will be described, the name of the subscriber 22 and the URL of a completion page to be served by the color image server 16 after the color profiling process is complete may be included in the request to color profile server 18. Subscribers 22 can be provided with a server-side scripting function that inserts the icon code with the appropriate URLs.

For the color profiling process, color profile server 18 serves a number of web pages that can be invoked by execution of a web page provided by subscriber server 12. In this case, the "return URL" is passed forward to each page in the sequence. The return URL can be passed as a parameter in the target URL, or by using hidden fields in forms. In some cases, the return URL can be stored as a server variable. As mentioned above, color profile server 18 handles two scenarios: (1) full color profiling when no profiler cookie exists, and (2) creation of a subscriber cookie when a profiler cookie already exists. In both scenarios, color profile server 18 transfers the contents of the existing or newly created profiling cookie to the pertinent subscriber 22. In particular, color profile server 18 may present a button that requests permission of the user associated with client 14 to transfer the information.

The URL for the button points to a page served by color image server 16. The request sent to color image server 16 includes both the return URL and the color information written in the profiler cookie The request preferably is a POST request from a form, rather than a GET request with all the information set forth in the URL due to length considerations. Color profile server 18 determines the URL of the destination page at subscriber 22 by reference to the return URL. Prior to transfer of the cookie contents, the user will want to know the destination. Accordingly, color profile server 18 displays the name of the particular subscriber 22 along with the button. If the name of the subscriber is not easy to determine from the URL, it can be generated by cross-referencing the URL to a name in a database accessible by color profile server 18, or by passing the name with the return URL in the original request from the page generated by subscriber server 12.

Upon receipt of the information from color profile server 18, the pertinent color image server 16 serves a page indicating that the color profiling process is complete. The page may be invoked by the POST request containing the color correction information and the URL of the "return" page, as received from color profile server 18. Color image server 16 writes the color correction information to the pertinent client 14 as a client cookie. From that point forward, the subscriber cookie is stored by the respective client 14, and is sent to the color image server 16 associated with the pertinent subscriber 22 with any request for a color correctable image. In response, color image server 16 extracts the contents of the subscriber cookie, applies a color correction to the requested image based on the contents, and delivers the color-corrected image to the client 14.

As an alternative approach, color correction can be passed from color profile server 18 to the color image server 16 associated with the respective subscriber 22 via a direct request, rather than being embedded in a request generated when client 14 clicks on a button, anchor, or other input medium. This approach is direct in the sense that the user need not intervene by submitting approval for the transfer to color profile server 18. Instead, the transfer of the content of the profile cookie to the appropriate color image server 16 can be made seamless.

Indeed, in some embodiments, the user associated with client 14 does not even view pages sent by color profile server 18 for transfer of information following the initial profiling. In this manner, the transfer of color correction information from color profile server 18 to a color image server 16 happens automatically, without requiring the user associated with a client 14 to click on a link to effect the transfer. This approach makes the transfer appear more seamless to the user. The end result is the same, i.e., the transfer of color correction information contained in a profiler cookie to create a subscriber cookie without the need for reexecution of the color profiling process by the user.

To facilitate transfer by direct request, the client 14 is assigned a client ID. Ordinarily, the client ID can be stored in and received from a subscriber cookie on the browser associated with a client 14. A client 14 that is new to the particular subscriber 22, i.e., a client that does not send a subscriber cookie to the particular color image server 16, will be assigned a new client ID, which is sent as a cookie with the HTML in the response from the color image server.

All URLs pointing to color profile server 18 then bear both the client ID and a subscriber ID as parameters, so that the color profile server can correlate requests for color correction information for the respective client 14. The URL for the color profiling icon points to color profile server 18 if there is no subscriber cookie. For this approach, it is preferred that the respective subscriber server 12 and corresponding color image server 16 occupy the same domain so that they can view the same cookies.

As in the indirect approach, a color profiling icon, which appears adjacent a color correctable image, may be served from either color image server 16 or color profile server 18 in the direct transfer approach, depending on whether the color image server receives a subscriber cookie. If a subscriber cookie is present, the profiling icon is served by color image server 16, and is formulated in appearance to indicate that color correction is active, e.g., with a text message to that effect. This will be the case for most images served by color image server 16 because only new clients 14 will not have the subscriber cookie.

If the subscriber cookie is not presented, the icon is served by color profile server 18. In other words, the web page served by color image server 16 has embedded in it an icon served by color profile server 18. If a profiler cookie is present, color profile server 18 serves an icon that indicates the client 14 has already been through the color profiling process. If not, the icon indicates that the color profiling process has not previously been completed by the respective client 14. This may be represented by a colored icon to indicate that color profiling has been completed, and a black-and-white icon to indicate that it has not.

In some embodiments, the icon may indicate that the client 14 has been through the color profiling process, but that the color correction information has not yet been forwarded to the particular subscriber 22, and that the image has not been color corrected. In either case, color profile server 18 also receives the ID for the client 14 and the subscriber 22, which are included in the URL forwarded to color profile server 18. If the profiler cookie is present, color profile server 18 immediately forwards the client ID and the contents of the profiler cookie to the pertinent color image server 16 in a special-purpose request.

If the subscriber cookie is present, color image server 16 performs the color correction based on the information contained in the cookie. If the subscriber cookie is not present, color image server 16 waits a short time to receive color information for this client from color profile server 18. If the information is forthcoming, color image server 16 applies the color correction and writes a subscriber cookie to the browser associated with the client 14. Otherwise, color image server 16 serves an uncorrected image.

With this direct approach, it may be necessary for color image server 16 to keep track of color correction information forwarded by the color profile server 18 because such information may not be received synchronously with image requests from clients 14. Accordingly, it may be necessary to incorporate a database application that can be shared by color image server 16 for temporary tracking of color correction information associated with individual clients 14, and subscriber server 12 for tracking and generation of client ID information. Once the information has been written to a subscriber cookie, the ID and color correction information for the respective client 14 can be purged from the database.

Management of ID's according to the direct transfer approach may take place as follows. The original color correction information generated by color profile server 18 can be stamped with a unique ID. The unique ID can be maintained in copies of the color correction information forwarded to subscribers 22. This ID changes if the client 14 repeats the color profiling process, and can be referred to as the profiler ID. The profiler ID will remain unchanged until the next pass through the color profiling process, which may occur months later. In effect, the profiler ID corresponds to a particular color profiling sequence. The profiler ID is supplemented by the client ID and the subscriber ID. The client ID identifies a client for whom a subscriber 22 is requesting color information, and the subscriber ID identifies the particular subscriber.

The client and subscriber IDs are passed via URL parameters to color profile server 18 whenever a color image server 16 has no color correction information for a particular client 14. The subscriber ID is passed back with the color correction information from color profile server 18 to the color image server 16 when the color profile server determines the appropriate information for the client, based on the contents of a profiler cookie or the results of running the color profiling process. Once color image server 16 receives this information and writes it as a subscriber cookie to the client's browser, the subscriber ID is no longer needed.

Figure 4:
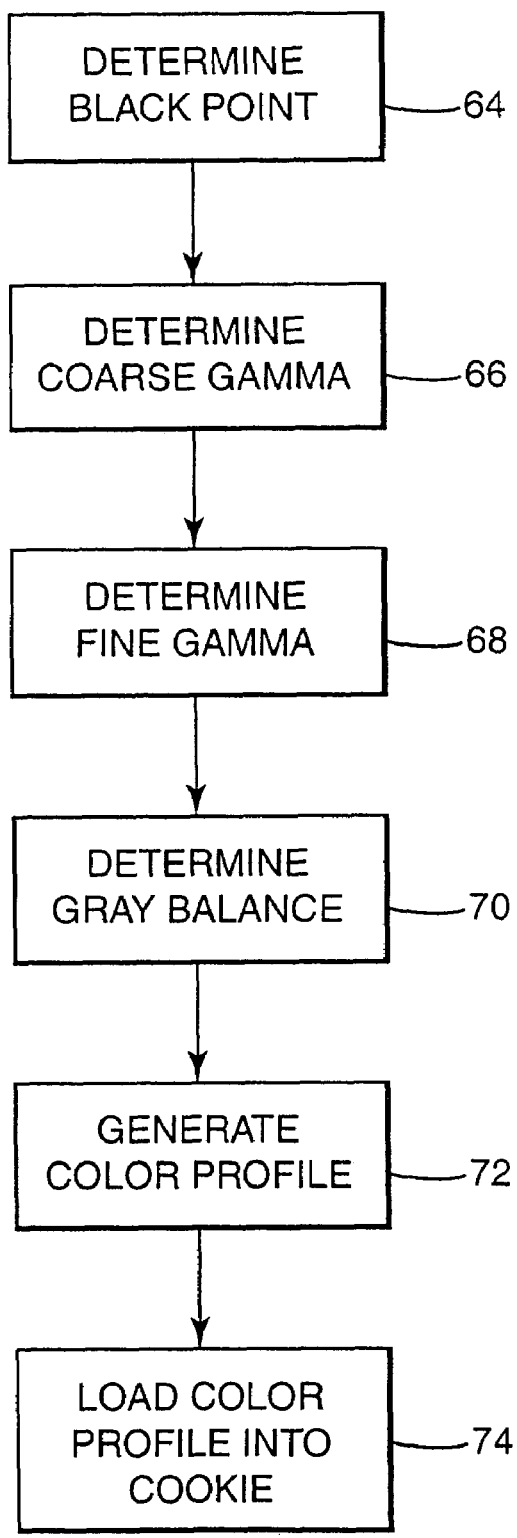
FIG. 4 is a flow diagram illustrating a color profiling process for a display device.

FIG. 4 is a flow diagram illustrating an example color profiling process for a display device. A process as shown in FIG. 4 can be used to generate the contents of a profiler cookie as discussed above with reference to FIG. 3. Notably, the entire color profiling process can be completed by the user with as few as three "clicks" of a pointing device. If the user is required to click a continue button to proceed after selecting a patch, the process may take additional clicks.

If the user is permitted to proceed automatically following selection of a patch, however, the entire process can be completed in three clicks. With optional analog adjustment, separate R, G, and B blackpoints, and fine gamma steps, to be described, the process may require up to six or seven clicks. Also, in many embodiments, the color profiling process requires no plug-ins or client side scripting when utilizing the method of selecting discrete elements, although such mechanisms can be provided in some embodiments such as in the use of slider adjustments.

The color profiling process enables visual profiling of a display device by determining accurate values of blackpoint and gamma for the R, G, and B phosphors or photodiode elements. Gamma refers to a parameter y that indicates the rate of change in light intensity with change in digital device value. The term "blackpoint" refers to the lowest RGB values capable of representation on the display device. For color values below the blackpoint, there is no further decrease in light emitted by the display device. Blackpoint is sometimes alternatively referred to as black onset. In accordance with the invention, three separate blackpoints are optionally determined, one for each of the R, G, and B color channels of the monitor. For use with more accurate monitors, a single dark gray RGB selection can be used to estimate a single average blackpoint value for R, G, and B.

In some display devices, such as older CRT monitors, different color channels can produce very different blackpoints. Accordingly, reliance on a single RGB blackpoint measurement in generating a color profile can introduce inaccuracies. Determination of channel-specific blackpoints, however, can reduce the degree of inaccuracy. In other words, by estimating the blackpoint for each color channel individually, a more accurate characterization of the colorimetric response of the display device can be obtained. A more accurate colorimetric characterization enables greater accuracy in conversion of color images for delivery and display on the particular monitor. For purposes of example, alternative color profiling processes are disclosed in U.S. patent application Ser. No. 09/631,312, to Kruse et al., filed Aug. 3, 2000, and entitled "COLOR IMAGE DISPLAY ACCURACY ACROSS A GLOBAL COMPUTER NETWORK," the entire content of which is incorporated herein by reference.

Color profile server 18 may administer a color profiling process as shown in FIG. 4 by serving a series of instructional web pages to client 14. In general, the color profiling process may involve determination of (1) blackpoint for each of the red, green, and blue (R, G, and B) color channels of the display device, (2) average gamma for R, G, and B, and (3) differences in gamma for R, G, and B. Due to the wide range of differences in display device properties, determination (2) above can be subdivided into determination of (2a) a coarse gamma estimate, and (2b) a fine gamma estimate. This process is described in greater detail below with reference to FIGS. 4–11.

With reference to FIG. 4, the color profiling process first involves determination of an estimated blackpoint for each of the color channels of the color display device (64), e.g., R, G, B. After determining the blackpoints, which may be merely an estimate, the color profiling process involves determination of the gamma exhibited by the display device. In particular, the process may involve determination of a coarse gamma (66), followed by determination of a fine gamma (68). Determination of the fine gamma may rely in part on the coarse gamma. In other words, the coarse gamma can be used as an initial estimate and starting point for convergence toward a more finely tuned gamma.

After determining the fine gamma, the process may involve determination of the gray balance exhibited by the display device (70). Gray balance provides an indication of the amount of color shift of a neutral gray toward one or more of the color channels used by the display device, e.g., red, green, and blue. The gray balance determination may rely in part on the gamma determined previously in the color profiling process and, in a particular embodiment, the fine gamma.

Next, the color profiling process involves generation of a color profile (72). The color profile contains information that characterizes the color response of the display device based on the determinations (64, 66, 68, 70), i.e., blackpoints, gamma, and gray balance. The color profile then can be loaded into a cookie, or other content container, and stored locally with client 14 for uploading to any of color image servers 16 when needed (74).

The estimated blackpoint parameters define the lower bound of the dynamic range of the display device. Because the maximum RGB value always defines white, the blackpoint defines the black end point, and therefore defines the domain of values for each of the R, G, and B color channels that results in a continuous change from black to white. Again, blackpoint refers to the R, G, or B value below which there is no further decrease in light emitted by the display device.

For an individual color channel, such as R, the blackpoint is the point at which further decreases in the R value produce no further decreases in R channel light emitted by the display device. If the blackpoint for a given color channel of a display device is high, values for that channel in darker regions will be mapped to the darkest shade and shadow detail will be lost if no image correction is performed. Accordingly, obtaining an accurate blackpoint estimate is important for the accuracy of images represented by the display device.

In addition to a multi-channel blackpoint estimate, the color profile includes a gamma parameter. The color profile also may include a gray balance parameter. The parameters together define the colorimetric response of an individual display device to enable modification of color images for more accurate representation on the device. The gamma parameter most affects the overall appearance of the image. Gamma determines whether an image appears overall too light or dark, or with too much contrast or too little. The third parameter, R, G, B gamma difference or "gray balance," is important because the human eye is very sensitive to gray balance. The gray balance parameter indicates the relative balance, or imbalance, between the different color channels of a display device when producing RGB color combinations.

Figure 5:
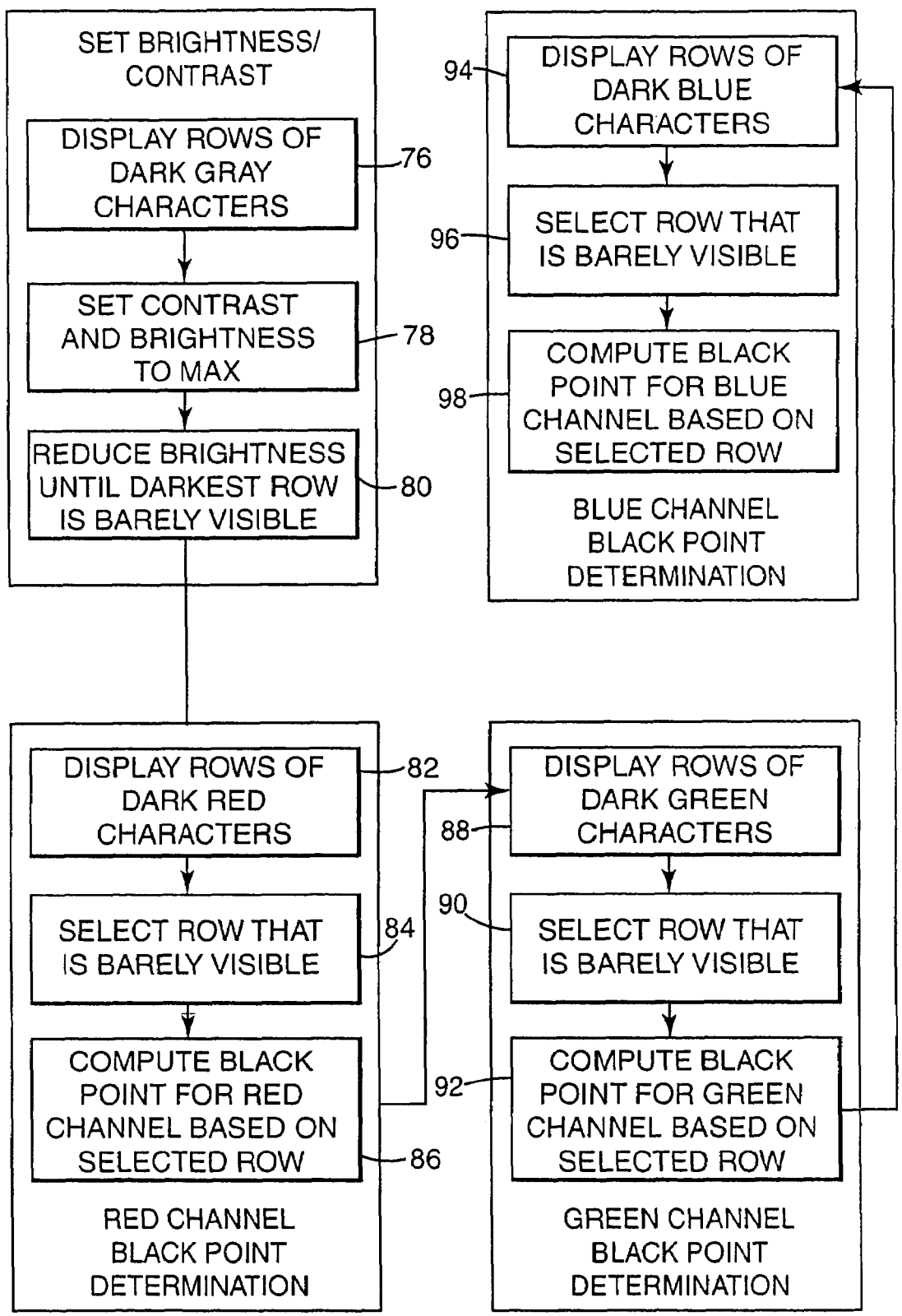
FIG. 5 is a flow diagram illustrating a multi-channel blackpoint determination in a color profiling process as shown in FIG. 4.

FIG. 5 is a flow diagram illustrating a color profiling process as shown in FIG. 4 in greater detail. As shown in FIG. 5, for blackpoint determination, color profile server 18 may serve one or more web pages for display device adjustment. Initially, the web page instructs the user to adjust the brightness and contrast of the display device This step of display device adjustment is optional, but generally desirable in preparing the display device for blackpoint determination. Color profile server 18 may serve a web page containing several rows of dark elements such as bars, patches, characters, letters, numerals and the like (76).

Instead of patches or bars, color profile server 18 may serve a web page having display elements with alternative shapes such as numerals. Whereas the patches or bars may be generally rectangular, more complex shapes can be used to aid the human eye in resolving visual differences. For example, numerals, letters, and other complex shapes can better engage the pattern recognition capabilities of the human eye and result in heightened sensitivity to gray scale differences.

When the human eye is called upon to perform pattern recognition, its sensitivity to color gradations between a given pattern and a surrounding area increase. The complex shape presents a longer boundary relative to simple shapes and promotes an increased perimeter for contrast. Elements with complex shapes may be used in the blackpoint, coarse gamma, and fine gamma determinations to characterize the monitor.

As an alternative to rows, the elements can be arranged in columns placed side-by-side across the web page. As a further alternative, each row or column may contain, instead of several elements, only one or a small number of elements. A larger number of elements in each given row may aid the user in resolving differences between elements in adjacent rows.

The web page may instruct the user to set the brightness and contrast of the display device to maximum (78). The rows (or columns) of elements may be arranged in a series. The elements in each row preferably exhibit the same darkness or lightness. However, the elements in each row in the series differ in relative darkness or lightness relative to the elements in other adjacent rows. For example, the darkest row of elements could be situated at the bottom, with rows containing elements with progressively lighter shades being situated above in ascending order. The web page instructs the user to reduce the brightness until the darkest row of elements is barely visible (80). At this point, the user may select "next" or some similar hypertext icon and proceed to the next step in the color profiling process, e.g., blackpoint determination for each of the red, blue, and green channels on an individual basis.

FIG. 6 illustrates an example web page 122 for use in display device adjustment in a color profiling process as shown in FIG. 5. Client 14 displays rows 124 of dark elements with the elements of each row having the same gray level value, but elements in adjacent rows having different gray levels. As an example, rows 124 of dark elements (shown as numerals in the example of FIG. 7) may be presented to the user with the following gray level values: 8, 16, 24, and 32. In other words, the rows of "zeros," "ones," "twos," and "threes" may have gray levels of 8, 16, 24, and 32, respectively.

As the rows of dark elements are displayed, the user is instructed to set brightness and contrast of the display device to maximum, using the analog or digital controls provided with the display device The user is then further instructed to reduce the brightness of the display device until the row with the darkest (lowest gray level value) elements is barely visible, and then click "next" upon completion. This optional step of display device adjustment serves to prepare the monitor for the blackpoint determination carried out with respect to each color channel, as described below.

To carry out the blackpoint determination process for each color channel, several rows (or columns) of dark elements for each color channel may be displayed on successive web pages. Specifically, red channel, blue channel, and green channel web pages for channel-specific blackpoint determination can be served to the client in any order. In each case, the dark elements for a given color channel may be arranged in rows in ascending or descending order of relative lightness or darkness, as in web page 122 of FIG. 6, which is served for display device adjustment. The rows provide a sequence of gray level gradations.

The bottom row for the red channel blackpoint determination web page, for example, may be a row of "zeros" having elements bearing the darkest shade (lowest gray value) of red among the elements shown on the web page. As with web page 122, arrangement of the elements in rows or columns is for purposes of illustration. In some embodiments, display of a series of individual elements (rather than rows of elements) may suffice.

The row of darkest elements that is barely visible to the user will depend on the blackpoint for the respective channel of the display device. The rows of elements are displayed against a black, i.e., RGB=0, background. With some display devices, the user may be unable to see elements with intensity levels of 8, 16, or higher. The user is instructed to select the row of elements that is barely visible on the display device This step determines the blackpoint, i.e., the visible "cut-off" point at which further decreases at which further decreases in the color channel value produce no further decreases in light emitted by the display device for that color channel. As an alternative, the user could be prompted to make the least visible row of elements vanish for a given color channel and then click on the remaining barely visible bar. In either case, the blackpoint can be estimated.

FIG. 7 illustrates an example web page 128 for use in blackpoint determination in a color profiling process as shown in FIG. 5. Web page 128 may be substantially similar to web page 122 of FIG. 6. For example, web page 128 may include rows 130 of shaded elements. Again, display of columns of elements or a series of elements may be sufficient for some applications. As shown in FIG. 7, web page 128 directs the user to select the row of elements 130 that is barely visible on the display device. As in web page 122, the rows 130 in web page 128 may be arranged as rows of "zeros," "ones," "twos," and "threes" having, for example, intensity levels of 8, 16, 24, and 32, respectively. Web page 128 in FIG. 7 represents the web page for red channel blackpoint determination, and includes rows of red elements set against a black background.

Upon selection of the row that is barely visible for the red channel, e.g., upon clicking on any element in the row, color profile server 18 automatically serves the user a substantially identical web page containing rows of green elements set against a black background for purposes of determining the green channel blackpoint. In this manner, the user selects a visible row or element that most closely appears to match, or blend with, the black background. Following selection of a row of green elements that is barely visible, color profile server 18 serves the user a substantially identical web page for blue channel blackpoint determination and the user makes a similar selection. Thus, color profile server 18 automatically servers successive web pages governing blackpoint determination for each color channel following selection of a row for a preceding channel. Alternatively, the web pages may prompt the user to click on a "next" icon or similar device. Serving successive web pages automatically following selection of an element may be desirable, of course, to reduce the overall number of clicks involved in the process.

In the above manner, the user selects the row of elements that is barely visible for each color channel, and thereby provides an indication of the blackpoint for each color channel. FIG. 5 further illustrates the process. In particular, FIG. 5 shows the display of rows of dark red elements or characters (82), and selection of the row that is barely visible (84), and further illustrates the computation of the estimated blackpoint for the red channel based on the selected row (86). Similarly, for the green channel, a row of dark green characters is displayed (88), followed by selection of the row that is barely visible (90), and computation of an estimated blackpoint for the green channel based on the selected row (92). Finally, for the blue channel, a row of dark blue characters is displayed (94), followed by selection of the row that is barely visible (96), and computation of an estimated blackpoint for the blue channel based on the selected row (98).

Following selection of the barely visible row of elements displayed on each successive web page, client device 14 transmits the result to color profile server 18. Alternatively, the results for all color channels can be transmitted at the same time following completion of the blackpoint determination for the last color channel. Color profile server 18 then may compute the estimated blackpoint for each channel (86, 92, 98), or simply store the parameters for later computation, e.g., by color imager server 16.

The complete description of the display device behavior can be represented by the following equation which relates RGB to XYZ:

$$\begin{bmatrix} X \\ Y \\ Z \end{bmatrix} = \begin{bmatrix} X_{r,\max} & X_{g,\max} & X_{b,\max} \\ Y_{r,\max} & Y_{g,\max} & Y_{b,\max} \\ Z_{r,\max} & Z_{g,\max} & Z_{b,\max} \end{bmatrix} \begin{bmatrix} R \\ G \\ B \end{bmatrix} \text{ where}$$

$$R = \begin{cases} [(d_r - k_{o,r})/(1.0 - k_{o,r})]^{\gamma_r}, & [(d_r - k_{o,r})/(1.0 - k_{o,r})] \geq 0 \\ 0 & [(d_r - k_{o,r})/(1.0 - k_{o,r})] < 0 \end{cases}$$

$$G = \begin{cases} [(d_g - k_{o,g})/(1.0 - k_{o,g})]^{\gamma_g}, & [(d_g - k_{o,g})/(1.0 - k_{o,g})] \geq 0 \\ 0 & [(d_g - k_{o,g})/(1.0 - k_{o,g})] < 0 \end{cases}$$

$$B = \begin{cases} [(d_b - k_{o,b})/(1.0 - k_{o,b})]^{\gamma_b}, & [(d_b - k_{o,b})/(1.0 - k_{o,b})] \geq 0 \\ 0 & [(d_b - k_{o,b})/(1.0 - k_{o,b})] < 0 \end{cases}$$

The variables $d_r$, $d_g$, and $d_b$ are the digital input values normalized to 1.0. The parameters $k_{o,r}$, $k_{o,g}$, and $k_{o,b}$ are the blackpoints and the parameters $\gamma_r$, $\gamma_g$, and $\gamma_b$ are the gammas for the red, green, blue channels.

The values of parameters $k_{o,r}$, $k_{o,g}$, and $k_{o,b}$ are determined as follows: Assume that (regardless of the properties of a particular monitor) for the red channel there exists a minimal visible set of values for XYZ that can be detected by the human eye, designated as the vector $(X_{t,r}, Y_{t,r}, Z_{t,r})$. This vector will have a unique corresponding value for R in the expression above, designated as $R_t$. For a particular monitor with specific values of $\gamma_r$ and $k_{o,r}$ there will be a unique device value associated with $R_t$ which is designated by $d_{t,r}$:

$$R_t = \begin{cases} [(d_{t,r} - k_{o,r})/(1.0 - k_{o,r})]^{\gamma_r}, & [(d_{t,r} - k_{o,r})/(1.0 - k_{o,r})] \geq 0 \\ 0 & [(d_{t,r} - k_{o,r})/(1.0 - k_{o,r})] < 0 \end{cases}$$

This device value $d_{t,r}$ is determined by the user during the color profiling procedure as described, i.e., by selecting the darkest barely visible row of elements in the blackpoint determination web page for red. The value of $R_t$ is empirically determined. For example, for a calibrated display system in a dark room with $k_{o,r}$=0.0 and $\gamma_r$=2.2, a red patch may be visible for $d_{t,r}$=8/255 gray levels which implies $R_t$=$(8/255)^{2.2}$.

The exact value of $k_{o,r}$ can be calculated by solving two simultaneous equations, namely the equation above for $R_t$ and the equation for $R_{0.33}$ which will be described below. Alternatively, a reasonable estimate can be made for $k_{o,r}$ by assuming a gamma of 2.2. If this assumption is made, the value of $k_{o,r}$ can be estimated as:

$$R_t = \left(\frac{8.0}{255.0}\right)^{2.2} = [(d_{t,r} - k_{o,r})/(1.0 - k_{o,r})]^{2.2}$$

$$\left(\frac{8.0}{255.0}\right) = [(d_{t,r} - k_{o,r})/(1.0 - k_{o,r})] \approx d_{t,r} - k_{o,r}$$

$$k_{o,r} = d_{t,r} - \left(\frac{8.0}{255.0}\right)$$

In a similar fashion, the values for $k_{o,g}$ and $k_{o,b}$, can be determined.

Figure 8:
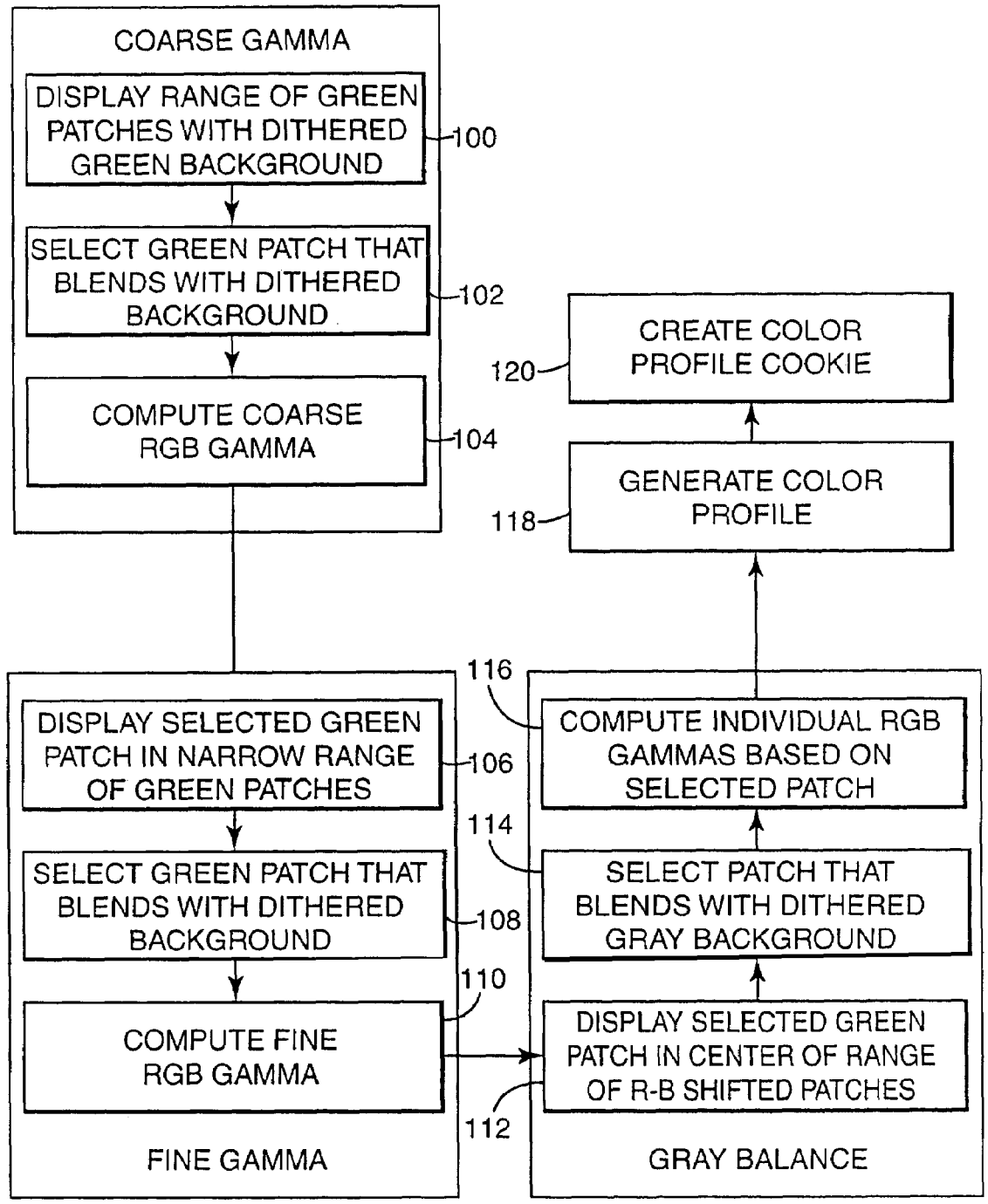
FIG. 8 is a flow diagram illustrating gamma and gray balance determination in a color profiling process as shown in FIG. 4.

FIG. 8 is a flow diagram illustrating gamma and gray balance determination in a color profiling process as shown in FIG. 5. For determination of coarse gamma, one of the web pages served by color profile server 18 displays a range of green elements, e.g., patches, against a dithered green background (100). The coarse gamma determination web page can be served immediately and automatically following selection of a row of elements in the last blackpoint determination web page, or in response to selection of a "next" icon or similar device.

In one embodiment, the coarse gamma determination is limited to only the green color channel. Specifically, the coarse gamma determination is made using a series of green elements against a green dithered background. Green is the most dominant and intense phosphor among red, green, and blue, and is highest in contrast. Green also has the highest L*. Note also that green most closely matches the photopic V($\lambda$) response of the eye. This approach to coarse gamma determination considers only the green color channel, and essentially ignores red and blue.

In this manner, the coarse gamma measurement concentrates on the most dominant color channel and avoids errors that can arise to the red-blue imbalances that are highly prevalent in many display devices. Thus, the elements displayed for the coarse gamma determination may be green patches with different darkness or lightness values. Alternatively, a combined coarse gamma for all of the color channels may be determined as described in the above-referenced U.S. patent application Ser. No. 09/631,312.

Figure 9:
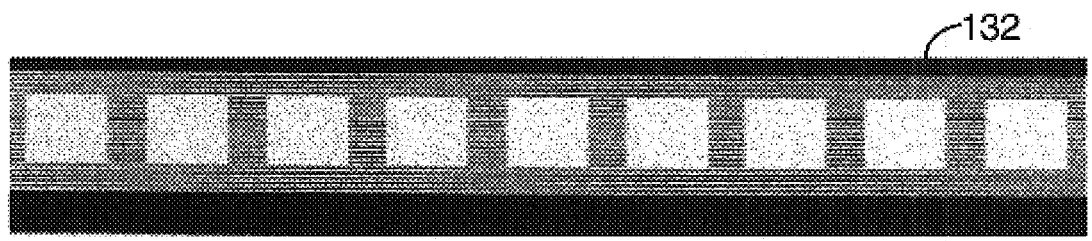
FIG. 9 illustrates a range of green elements for use in determining a coarse gamma in a color profiling process as shown in FIG. 4.

Upon display of the green patches, the user is instructed to select a patch that appears to most closely blend with the dithered green background (102), as indicated in FIG. 8. The green patch "blends" with the dithered background in the sense that it appears to closely match the level of the background. An example of a range of green patches displayed against a green dithered background is shown in FIG. 9 and indicated by reference numeral 132. This range of green patches and the green dithered background can be displayed in a web page served by color profile server 18.

Based on the selected green patch, which again may be selected by clicking on it with a pointing device, color profile server 18 computes a coarse gamma (104), as indicated in FIG. 8. Alternatively, the computation may take place later at color image server 16. The coarse gamma determined in this step can be used as an estimate for the average gamma of R, G, and B via selection of a green patch from the set of green patches against the dithered green background The dithered green background may be set at approximately 25% to 50%. Dithered backgrounds approaching approximately 33% may more closely match the actual midpoint of black to green transition for the display device, and may be preferred for typical display devices.

By alternating black and green at an appropriate frequency, a 25%, 33%, or 50% green background can be produced. For a CRT, turning on or off all of the pixels in a given horizontal line should produce more predictable output from display device to display device than modulating individual pixels to form vertical lines, due to the video bandwidth of the device. For flat panel devices, this is less of an issue. To accommodate clients using both CRT's and flat panel devices, however, generation of the dithered background by use of alternating horizontal lines is preferred.

The center patch in the range 132 of patches can be based on an average gamma of 2.0, since most monitors range from 1.6 to 2.5. The other green patches that surround the center patch may proceed in a sequence with relatively large steps, e.g., 8 gray levels apart from one another. Coarse gamma can be estimated using the equation:

$$G_{0.33} = 0.333 = [(d_{0.33,g} - k_{o,g})/(1.0 - k_{o,g})]^{\gamma_g}$$

where $d_{0.33,g}$ is the gray level value (normalized to 1.0) of the selected patch that appears to most closely blend in with the background, $k_{o,g}$ is the previously determined blackpoint, $G_{0.33}$ is the relative intensity of the green channel (equal to ⅓), and $\gamma_g$ is the green gamma. As an alternative to actually computing the coarse gamma, the green level value of the selected patch simply is carried forward for use in the fine gamma process. In this case, the value can eventually be discarded.

After the coarse gamma estimate is obtained, fine gamma is estimated. Fine gamma is a refined or "fine-tuned" estimate for the average gamma of R, G, and B. Fine gamma can be determined by selection of another green patch from a set of green patches presented against a dithered green background. In this case, the center patch may be identical to the green patch selected by the user for determination of coarse gamma. Thus, the coarse gamma step "informs" the fine gamma step. In effect, the selected coarse gamma patch may serve as a starting point for the fine gamma determination. Specifically, the green patch selected in the coarse gamma determination can be used to form the central patch for the fine gamma determination.

Figure 10:
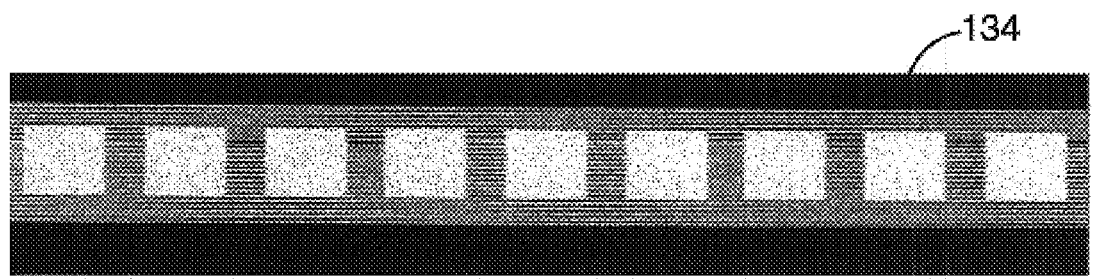
FIG. 10 illustrates a range of green elements for use in determining a fine gamma in a color profiling process as shown in FIG. 4.

A range of patches for determining fine gamma is illustrated in FIG. 10 and designated by reference numeral 134. The patches in this range are in a sequence with smaller steps centered about the center green patch selected in the coarse gamma process. For example, the patches may be set at 4 green levels apart, in contrast to the 8 green levels used as the difference for the coarse gamma determination. In this manner, a narrower range is used to "fine-tune" the coarse gamma estimate, with the center of the range having been "learned" from the coarse gamma estimate.

A web page served by color profile server 18 displays the selected green patch from the coarse gamma estimate among a narrower range of green patches (106). The user then is instructed to select the green patch that most closely blends with the same dithered green background as used for coarse gamma (108). Based on the selected patch, color profile server 18 computes a single fine RGB gamma (110). Thus, the fine gamma is the overall gamma estimated for each of the RGB channels.

Alternatively, as mentioned above, the RGB value of the selected patch can simply be stored for use by color image server 16 in computing fine gamma and rendering color corrections. In any event, a refined estimate for gamma can be computed according to the equation:

$$G_{0.33} = 0.333 = [(d_{0.33,g} - k_{o,g})/(1.0 - k_{o,g})]^{\gamma_g}$$

where $d_{0.33,g}$ is the green level value (normalized to 1.0) of the selected patch that blends in with the background, $k_{o,g}$ is the previously determined blackpoint, $G_{0.33}$ is the relative intensity of the green channel (equal to ⅓), and $\gamma_g$ is the green gamma.

To determine gray balance, color profile server 18 serves a web page that displays a plurality of RGB patches. The RGB patches can be generated with the same value of green selected in the previous fine gamma step in conjunction with values of red and blue that are substantially equal to or systematically shifted from the previously selected value of green. The RGB patches can be displayed against a gray background which is dithered in the same manner as the green dithered background of the previous step (fine gamma) (112).

Again, this step "learns" from the previous one, and forms part of a cascading series of color profiling steps (coarse gamma, fine gamma, and gray balance) that help narrow the search for the correct gamma The user is then instructed to select the gray patch that appears to most closely blend with the dithered gray background (114). Based on the selected gray patch, individual RGB gammas are computed (116). Notably, the overall gray balance determination can be made with a single click of the user's pointing device.

Thus, in this gray balance process, the green intensity value for the patch selected in the fine gamma process is used to generate the gray patches that exhibit +/–(plus/minus) differences or "shifts" in red and blue about the value of the central gray patch derived from the gamma estimate. For example, the value of green selected in the fine gamma process can be displayed om a patch in the center of the range in conjunction with substantially identical values of red and blue.

The gammas for red and blue are then fine tuned by the gray balance determination, which helps identify red-blue imbalance in the display device. Thus, the green gamma is "locked in" in the gray balance step, while the red and blue imbalance is determined. In other words, every patch in the gray balance array carries the same green value, but is modulated by different gradations of red and blue. This step eliminates one axis of variation, green, but permits identification of any imbalance between red and green or between blue and green. This limits the range of choices to a more finely-tuned area, and aids the user in making a more accurate selection.

The range of patches for the gray balance determination may be a two-dimensional array of patches with red-blue-shifted patches arranged around the central gray patch formed according to the gamma estimate from the fine gamma process. In particular, the central gray element can be based on the estimated RGB gamma derived from the green channel in the gamma determination. In other embodiments, the red channel could be used to determine the initial RGB gamma estimate, followed by a gray balance determination that resolves imbalance between green and red or blue and red.

Figure 11:
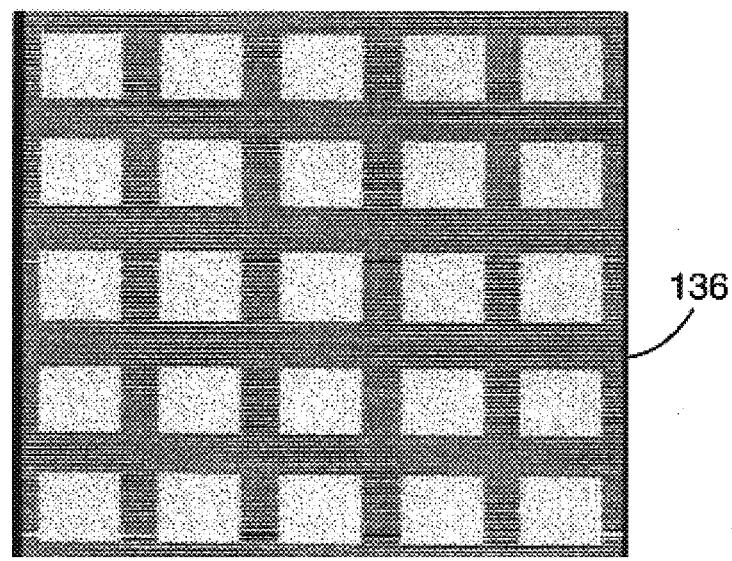
FIG. 11 illustrates a range of gray elements for use in determining gray balance in a color profiling process as shown in FIG. 4.

FIG. 11 illustrates an example of a two-dimensional range 136 of gray patches arranged in a five-by-five matrix for use in the gray balance determination. Each patch represents a shift away from the central gray patch along either the blue axis, the red axis, or a combination of both, but preferably does not represent any further green shift. The user selects the patch that appears to most closely blend with the dithered gray background, which may be a 33% dithered background. The central patch can optionally be highlighted to indicate it is the preferred default choice.

The number of patches and the exact values of RGB for each patch can be quite flexible. For example, in the case of the image in FIG. 11, all patches can be selected to have identical values of L* as indicated by the estimated profile for the display based on phosphors, average gamma, and blackpoint. Patches adjacent to the center may differ by all permutations of +/–3 ΔE for a* and for b* as estimated from a Matrix TRC (tone reproduction curve) profile constructed from the above parameters.

Patches around the outer perimeter of the grid array may differ from the center by +/–6 ΔE in R and B. Alternatively, for simplicity, one can elect to vary R and B only by +/– a fixed amount such as +/–5 gray levels and +/–10 gray levels. Preferably, all patches are relatively small deviations from the central patch in all directions of color space of approximately constant L*. This test will help determine in a sensitive manner whether there exists a significant difference in the gammas of R, G, and B, and thereby expose significant gray imbalance between R and B.

The two-dimensional format of the patches shown in FIG. 11 may aid the user's selection of the correct patch. A gray patch with red, green, and blue values that correspond to the initial gamma from the previous step in the color profiling process, i.e., fine gamma, is placed at the center in this embodiment. Adjacent patches differ in gray level as the array extends outward such that the outer periphery of the array contains patches that are two gradations removed from the central patch. The array produces a visual "funnel" effect that, from experience, tends to direct the user toward the central patch as the starting point for matching with the background. The differences between patches in the two-dimensional array are more clear and dramatic than in a one-dimensional strip of patches. As the array extends outward, the shift becomes greater. Thus, the gradations are well pronounced and aid the user in picking the appropriate patch which, in many cases, will be the central patch selected in the previous step of the color profiling process.

If the user selects the central patch, the same gamma value is used for the R, G, and B channels. If one of the other patches are selected, three separate gammas are calculated based on the equations:

$$R_{.33} = .333 = [(d_{.33,r} - k_{o,r})/(1.0 - k_{o,r})]^{\gamma_r}$$

$$B_{.33} = .333 = [(d_{.33,b} - k_{o,b})/(1.0 - k_{o,b})]^{\gamma_b}$$

where the subscripts for $\gamma$ and $d_{0.33}$ indicate unique values for the R and B channels. The values for $d_{0.33}$ for each channel are given by the values of RGB of the particular patch selected in this gray balance step. These equations are combined with a set of phosphor values to generate accurate profiles for the client's display device, using equations well known in the art, and referred to as Matrix TRC formalism in the International Color Consortium (ICC) specification. Again, calculations can be performed by color profile server 18 or by a color correction module associated with color image servers 16.

The process of selecting patches in the coarse gamma, fine gamma, and gray balance determination steps is advantageous because, in preferred embodiments, it requires no applications, applets, or other client-side scripts to be loaded at the client side. Rather, the user may simply select one of the patches displayed in a web page. In other embodiments, however, if applications, applets, or client-side scripts are used, it is conceivable that smooth slider bars, +/– arrows, and the like could be used to adjust the color of a single patch in real-time for comparison to the dithered background. In this manner, the user has the ability to precisely match a single patch to the background, rather than select from a finite set of patches the one that most closely matches. This technique of real-time adjustment also may be useful for non-networked approaches to color calibration and characterization. In this case, for blackpoints, gamma, and/or gray balance, the patch or element selected by the user may be a single adjustable patch in a condition in which the slider or other adjustment medium has adjusted its color to a level that is visually acceptable to the user, i.e., to a point at which the patch appears to match the dithered background.

Based on the blackpoint, coarse gamma, fine gamma, and gray balance processes, a color profile for the display device is generated (118). Upon generation of the color profile, a color profiler cookie is created (120). Information representative of the color profile is added to the color profiler cookie for future use. In particular, the information can be used to create a subscriber cookie for future interaction between the particular client 14 and the particular subscriber 22 and color image server 16. Although the color profile is especially useful for characterizing display devices in a network, it also may be useful in a non-networked application. In particular, the color profiling process described herein may find ready use in the calibration and characterization of an individual display device for correction of content generated or obtained locally with the device, rather than across a network.

Advantageously, there is no need for the client 14 to provide information regarding the configuration of its display device. Very satisfactory results can occur using an average set of phosphor values based on published standards such as sRGB, Apple Macintosh RGB, and the like. If desired, further steps can be added, particularly in order to address the issue of phosphor values and white point The color profiling process simply results in generation of a cookie that serves as a container and vehicle for passing information characterizing the color response of the display device associated with client 14 to color image server 16. Alternatively, the chromaticity information and white point can in some cases be obtained from the display utilizing communication protocols such as VESA and/or from the operating system of the computer. The usefulness of this invention will continue because, with current technology, the RGB blackpoints and gammas are difficult to maintain perfectly at the hardware level even with expensive electronic circuitry.

Ordinarily, all cookies visible to a particular domain are attached to each request from a browser application executed by a client 14. For this reason, a typical browser limits each domain to a maximum of twenty cookies. To avoid consuming the allotment of cookies for a particular subscriber 22, all of the color correction information for a particular client 14 preferably is packed into a single profiler cookie and a single subscriber cookie. For example, a number of items can be packed into the value string of the subscriber cookie or the profiler cookie, as the case may be. In particular, each cookie should include the gamma values for R, G, and B. Each gamma value may be a value between 1.0 and about 3.0. In addition, the cookie may include the chromaticity values for black and white, e.g., expressed as a value between 0 and +1000.0.

An exemplary cookie may have the following items packed into its value string, each demarcated by a separator:

(1) Cookie format version code—a numeric code, e.g., 1 to 3 bytes, plus separator.

(2) Cookie installation date—the usual cookie-style timestamp (milliseconds after midnight of Jan. 1, 1970, GMT), e.g., 12 to 13 bytes, plus separator.

(3) Unique profiler ID assigned to this color information when it is generated by the color correction sequence; a long integer, e.g., 4 bytes, plus separator (but possibly longer).

(4) Gamma and blackpoint values for R, G, B—each a text representation of a floating-point value between 1.0 and about 3.0, retaining 4 decimal digits. The decimal point could be implied. Thus, the gamma values may take up 5 or 6 bytes plus a separator each, or three times that overall. Alternatively, the selected tint values chosen for R, G, and B can be indicated, enabling the gamma and blackpoint values to be calculated at a later time by a server upon upload of the cookie.

(5) Chromaticity for Black and White—each a text representation of a floating-point value between 0 and +1000.0, retaining 4 significant digits. Thus, this may take up 6 or 7 bytes plus a separator each, or two times that overall.

(6) Number of bits per color—two decimal digits: two bytes plus separator.

(7) Display Device ID code—an alphanumeric code, which may be roughly 10 bytes plus separator.

(8) Cookie Data Checksum—a long integer: 4 bytes.

The example cookie described above has about 68 bytes plus 10 separators. The separator character should be chosen so that the string does not have to be "escaped"; the caret (^) is frequently used this way. Thus, the typical size for the value string may be about 80 bytes.

Figure 12:
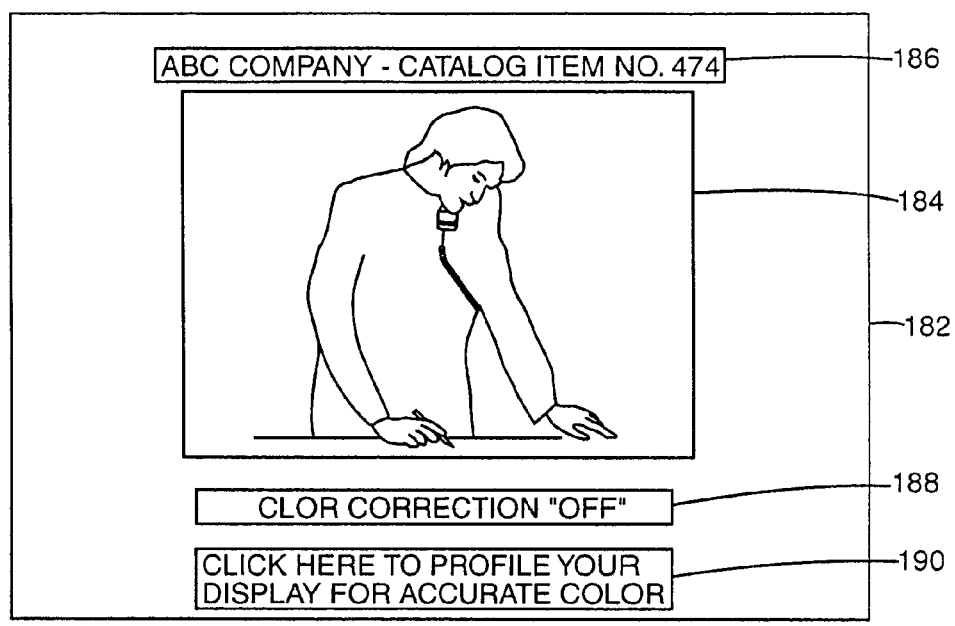
FIG. 12 illustrates an example of a color image transmitted to a client in a system as shown in FIGS. 1 and 2.

FIG. 12 is an example of a color image 184 transmitted to a client 14 in a system as shown in FIGS. 1 and 2. As shown in FIG. 12, the image 184 may be presented on a screen 182 on a display device associated with a client 14. A color image server 16 associated with a particular subscriber 22, such as "ABC Company," delivers image 184 to the client 14 upon request. For purposes of illustration, image 184 may be accompanied by a legend 186 that identifies the subscriber 22 and a particular item being displayed. Also, an icon, button, or the like may accompany image 184 and indicate whether color correction has been applied by color image server 16, as indicated by reference numeral 188. In the example of FIG. 12, color correction has not been applied, e.g., because a subscriber cookie has not yet been generated for the particular subscriber 22. Another icon, button, or the like may be displayed to invite the user to profile its display device, as indicated by reference numeral 190.

Elements 188 and 190 could be integrated with one another, as discussed previously, and take on an appearance such as a particular color scheme that indicates whether color correction has been applied. In either case, element 190 provides a hypertext link to the URL associated with color profile server 18. Thus, when the user clicks on element 190, pages are requested from color profile server 18 for initiation of the color profiling process. If a profiler cookie already exists, however, it is sent by client 14 to color profile server 18. In that case, there is no need to repeat the color profiling process. Instead, color profile server 18 creates a subscriber cookie for the pertinent subscriber 22, and forwards it to the associated color image server 16, either directly without user intervention or indirectly with user approval as previously described.

Figure 13:
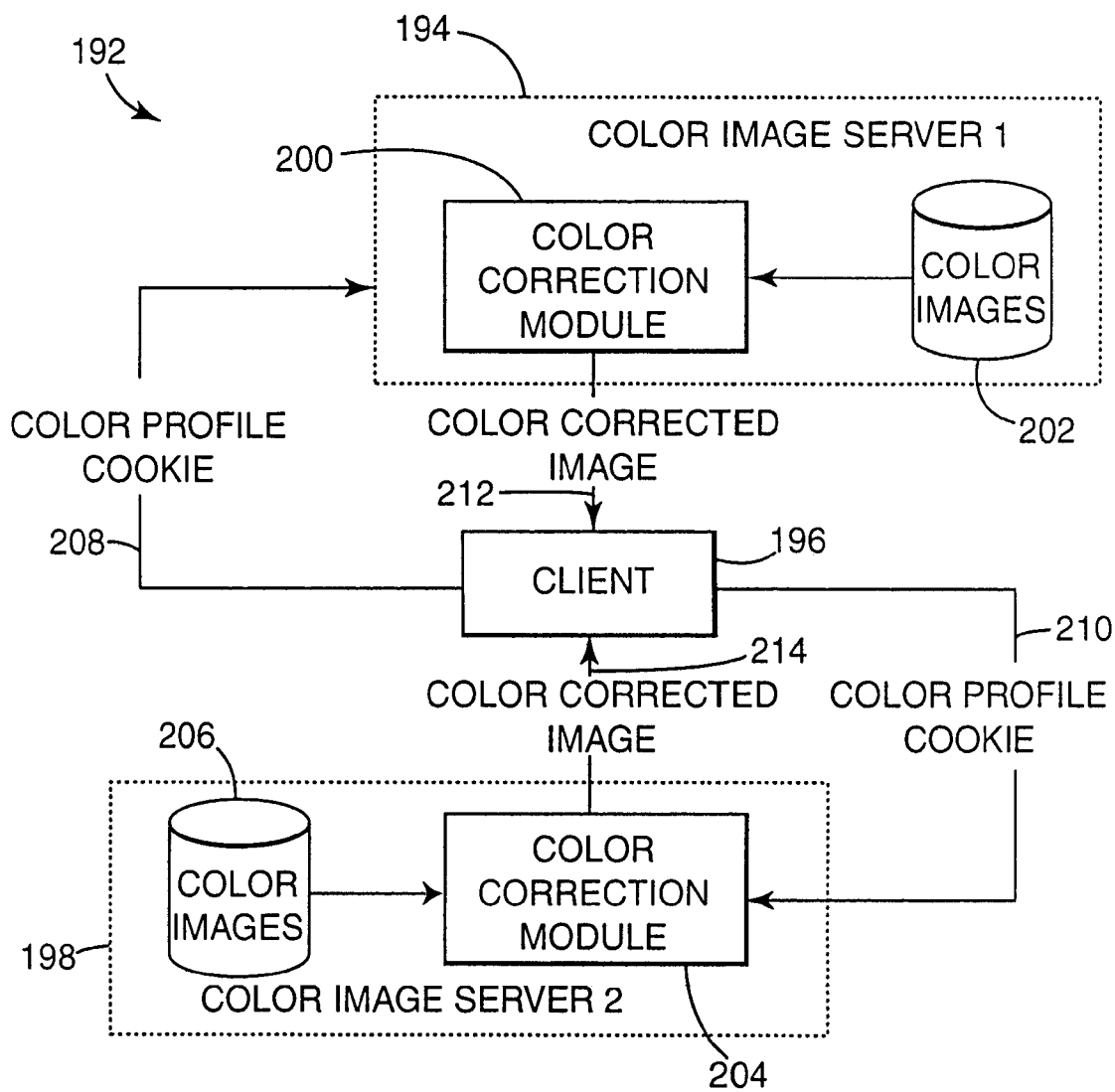
FIG. 13 is block diagram illustrating transmission of color correction information in a system as shown in FIGS. 1 and 2.

FIG. 13 is block diagram illustrating transmission of color correction information in a system as shown in FIGS. 1 and 2. In particular, FIG. 13 illustrates a situation in which subscriber cookies have already been created for color image servers 194, 198 associated with particular subscribers 22 accessed by an individual client 196. In this case, upon accessing a web page from a subscriber server 12, client 196 requests images from color image server 194. When requesting images from another subscriber 22, client 196 requests images from color image server 198. Color image server 194 incorporates both a color correction module 200 and an archive 202 of color images. Similarly, color image server 198 includes a color correction module 204 and an archive of color images 206.

When client 196 sends an image request to color image server 194, it sends along a color profile cookie, i.e., a subscriber cookie, as indicated by line 208. Likewise, as indicated by line 210, client 196 sends a subscriber cookie to color image server 198 when requesting an image. In each case, the subscriber cookie contains a color profile that provides color correction information for use by the respective color correction module 200, 204 in modifying, i.e., color correcting, the color images served from image archives 202, 206, respectively. Thus, when a request is received, color images server 194 or 198 processes the accompanying subscriber cookie to extract the contents, and controls the color correction module 200, 204 based on the extracted contents. In this manner, client 196 receives color corrected images, as indicated by reference numerals 212 and 214.

The manner in which color correction modules make use of the color profiles contained in the subscriber cookies will now be described. The foregoing discussion associated with FIGS. 4–11 above has utilized simplified one dimensional formulas to explain the relevance of blackpoint, average gamma, and adjusted gammas for RGB to account for gray balance. In the embodiment described with reference to FIGS. 4–11, blackpoints for each color channel are estimated based on red, green, and blue elements selected by a user associated with a respective client 14. Thus, the output of the color profiling process is a blackpoint RGB value and a gamma, or individual RGB gammas. Now we assume that these values have been determined in the manner described above. The complete description of the display device behavior can be given by the following equation which relates RGB→XYZ:

$$\begin{bmatrix} X \\ Y \\ Z \end{bmatrix} = \begin{bmatrix} X_{r,\max} & X_{g,\max} & X_{b,\max} \\ Y_{r,\max} & Y_{g,\max} & Y_{b,\max} \\ Z_{r,\max} & Z_{g,\max} & Z_{b,\max} \end{bmatrix} \begin{bmatrix} R \\ G \\ B \end{bmatrix} \text{ where }$$

$$R = \begin{cases} [(d_r - k_{o,r})/(1.0 - k_{o,r})]^{\gamma_r}, & [(d_r - k_{o,r})/(1.0 - k_{o,r})] \geq 0 \\ 0 & [(d_r - k_{o,r})/(1.0 - k_{o,r})] < 0 \end{cases}$$

$$G = \begin{cases} [(d_g - k_{o,g})/(1.0 - k_{o,g})]^{\gamma_g}, & [(d_g - k_{o,g})/(1.0 - k_{o,g})] \geq 0 \\ 0 & [(d_g - k_{o,g})/(1.0 - k_{o,g})] < 0 \end{cases}$$

$$B = \begin{cases} [(d_b - k_{o,b})/(1.0 - k_{o,b})]^{\gamma_b}, & [(d_b - k_{o,b})/(1.0 - k_{o,b})] \geq 0 \\ 0 & [(d_b - k_{o,b})/(1.0 - k_{o,b})] < 0 \end{cases}$$

The variables $d_r$, $d_g$, and $d_b$ are the digital input values for the red, green, and blue channels normalized to 1.0. The parameters $k_{o,r}$, $k_{o,g}$, and $k_{o,b}$, are the blackpoints for the red, green, and blue channels, and the parameters $\gamma_r$, $\gamma_g$, and $\gamma_b$ are the gammas for the red, green, blue channels. Thus, the gamma and blackpoint information contained in the subscriber cookie for a respective display device can be used in the above equations to produce, in effect, a destination device profile. The destination device profile, with a source profile previously computed for the requested image, can be used to perform a transformation of the image data sufficient to produce calibrated output on the display device.

The above approach is different than other attempts to characterize display devices such as equation 21 in Berns, "CRT Colorimetry. Part I: Theory and Practice."In most characterizations, the "k" parameters are used to describe black offset rather than blackpoint. Black offset refers to the non-zero intensity measured or perceived from a display for RGB=0. In our experience, the contrast/brightness adjustment procedure used in a color profiling process in accordance with embodiments of this invention minimizes the effect of this phenomenon. However, non-zero blackpoints are very possible even after the contrast/brightness adjustment, and therefore should be taken into account.

This profile description can either be used in this format or converted to formats such as those specified by the ICC. This format is also known as the Matrix TRC format, and utilizes a generic lookup table for the expressions above for R, G, and B rather than an equation combined with a matrix similar to above. The above information, e.g., gammas, blackpoints, and the like, can be stored in a cookie on a computer associated with a client 14. Alternatively, the individual data which are the RGB values of the patches selected by the user can be stored in the cookie, which can permit improved profile technology to be employed at a later date utilizing the same input information.

To implement a system as described herein with an existing archive of images and HTML codebase for a particular subscriber 22, the existing subscriber server 12 is modified to replace existing image file references indicated in HTML pages with similar references to a pertinent color image server 16 equipped with a color correction module. For example, an existing subscriber image file reference called:

http://SubscriberName.com/images/ImageName.jpg
    could be replaced with:
http://correction.SubscriberName.com/images/Image-Name.jpg.

These modified references in the HTML page then issue a command to the color image server 16 to serve the requested image. When the color image server 16 receives the command, it also receives the subscriber cookie, if one exists, and applies the information contained in the cookie to perform color correction. The color image server 16 then reads the pertinent image file, creates a unique display profile utilizing the display parameters stored in the subscriber cookie, and converts the image from source to destination before sending it to the client's browser.

All images stored on the subscriber server 12 may have a corresponding copy file of the same name residing on the subscriber color image server 16. The color image server 16 may access this database of image files to read, convert, and send images referenced by the HTML page sent to the client 14. According to one embodiment, color image server 16 may use a very simple and quick technique for color management. In particular, all images on the color image server 16 preferably have a predetermined RGB color space. This typically means that original images are converted from the color space of corresponding source devices, e.g., such as scanners, digital cameras, and the like, to the standard color space determined by the subscriber 22. Good examples of standard RGB color spaces are ColorMatch RGB, which has a color temperature for the "virtual display" of D50. Other color spaces such as Adobe RGB have an excellent gamut, but have a color temperature of D65. When an image on an HTML page sent to the client 14 is referenced via the color image server 16 associated with a subscriber server 12 such as:

correction.SubscriberName.com/images/ImageName.jpg color image server 16 accesses the corresponding image and converts the RGB data in real time before sending the image to the client destination. The conversion can be performed according to the following calculation:

$$R_s = \begin{cases} [(d_{r,s} - k_{o,r,s})/(1.0 - k_{o,r,s})]^{\gamma_{r,s}}, & [(d_{r,s} - k_{o,r,s})/(1.0 - k_{o,r,s})] \geq 0 \\ 0 & [(d_{r,s} - k_{o,r,s})/(1.0 - k_{o,r,s})] < 0 \end{cases}$$

$$G_s = \begin{cases} [(d_{g,s} - k_{o,g,s})/(1.0 - k_{o,g,s})]^{\gamma_{g,s}}, & [(d_{g,s} - k_{o,g,s})/(1.0 - k_{o,g,s})] \geq 0 \\ 0 & [(d_{g,s} - k_{o,g,s})/(1.0 - k_{o,g,s})] < 0 \end{cases}$$

$$B_s = \begin{cases} [(d_{b,s} - k_{o,b,s})/(1.0 - k_{o,b,s})]^{\gamma_{b,s}}, & [(d_{b,s} - k_{o,b,s})/(1.0 - k_{o,b,s})] \geq 0 \\ 0 & [(d_{b,s} - k_{o,b,s})/(1.0 - k_{o,b,s})] < 0 \end{cases}$$

$$\begin{bmatrix} R_c \\ G_c \\ B_c \end{bmatrix} = \begin{bmatrix} X_{r,c,\max} & X_{g,c,\max} & X_{b,c,\max} \\ Y_{r,c,\max} & Y_{g,c,\max} & Y_{b,c,\max} \\ Z_{r,c,\max} & Z_{g,c,\max} & Z_{b,c,\max} \end{bmatrix}^{-1} \begin{bmatrix} X_{r,s,\max} & X_{g,s,\max} & X_{b,s,\max} \\ Y_{r,s,\max} & Y_{g,s,\max} & Y_{b,s,\max} \\ Z_{r,s,\max} & Z_{g,s,\max} & Z_{b,s,\max} \end{bmatrix} \begin{bmatrix} R_s \\ G_s \\ B_s \end{bmatrix}$$

$$d_{r,c} = k_{o,r,c} + (1.0 - k_{o,r,c})\min(1.0, R_c)^{1/\gamma_{r,c}}$$

$$d_{g,c} = k_{o,g,c} + (1.0 - k_{o,g,c})\min(1.0, G_c)^{1/\gamma_{g,c}}$$

$$d_{b,c} = k_{o,b,c} + (1.0 - k_{o,b,c})\min(1.0, B_c)^{1/\gamma_{b,c}}$$

Note that the matrices above can be concatenated into a single matrix for increased processing speed.

Figure 14:
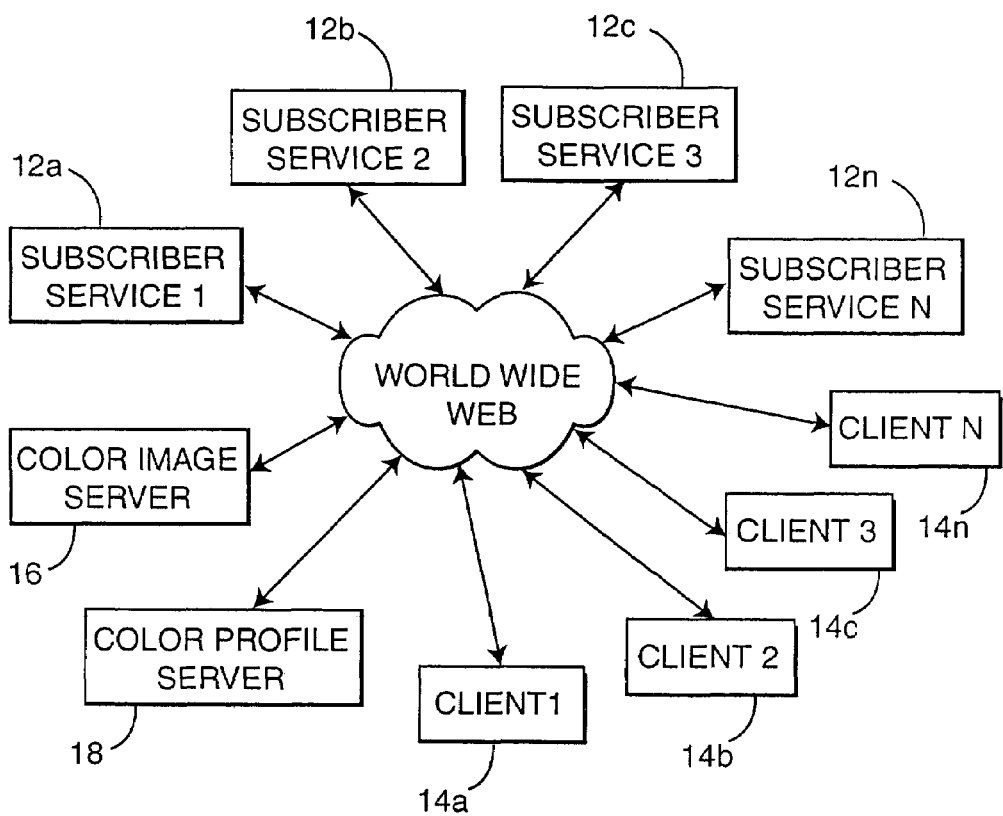
FIG. 14 is a block diagram illustrating an alternative architecture for a system for improving color image display accuracy in a computer network.

FIG. 14 is a block diagram illustrating an alternative architecture for a system 214 for improving color image display accuracy in a computer network. System 214 conforms substantially to the system shown in FIG. 2, except that all images for the subscribers are stored at a central color image server 16. Color profiling server 18 may reside or be integrated with color image server 16 in the embodiment of FIG. 14. In this case, color profiling server 18 provides web pages for guidance of a color profiling process as described herein.

Color image server 16 or color profile server 18 may include a database server for storage of individual color profiles associated with clients 14. When a client 14 requests an image tagged in the code sent by one of subscriber servers 12, it is directed to the central color image server 16. The color image server 16 may use a client ID sent from the client to retrieve the appropriate color profile and apply it to modify the requested color image using techniques as described herein for color correction. In this manner, color image server 16 provides color corrected images without the need for transfer of cookies and the like between clients 14 and the color image server.

A number of embodiments of the present invention have been described. Nevertheless, it will be understood that various modifications may be made without departing from the spirit and scope of the invention. Accordingly, these and other embodiments are within the scope of the following claims.

The invention claimed is:

1. A method comprising:
   determining an estimated value for a green gamma for a display device having red, blue and green channels based on selection of a displayed green element that appears to most closely blend with a dithered green background;
   estimating initial gamma values for red and blue channels of the display device based on the estimated green gamma value;
   performing a gray balance evaluation for red and blue channels relative to the green channel using the estimated initial gamma values for red and blue channels; and
   modifying the estimated gamma values for red and blue color channels based on the gray balance evaluation for the red and blue color channels.

2. The method of claim 1, the method further comprising:
   modifying a color image based at least in part on the estimated gamma values; and delivering the modified color image to the display device.

3. The method of claim 1, wherein the display device is associated with a client residing on a computer network, the method further comprising:
   transmitting information representing the estimated gamma values to a remote server on the network;
   modifying the color image at the remote server based on the information; and
   delivering the modified color image to the client via the computer network for display on the display device.

4. The method of claim 1, wherein estimating the green gamma value includes: selecting one of a first plurality of green elements displayed by the display device that appears to most closely blend with the dithered green background;
   estimating a coarse green gamma value for the display device based on the selected one of the first plurality of green elements;
   selecting one of a second plurality of green elements displayed by the display device that appears to most closely blend with the dithered green background, wherein the second plurality of green elements includes the selected one of the first plurality of green elements; and
   estimating a fine green gamma value for the display device based on the selected one of the second plurality of green elements, wherein the estimated fine green gamma value is the estimated green gamma.

5. The method of claim 4, wherein the first plurality of green elements represent greater gradations in green intensity than the second plurality of green elements.

6. The method of claim 1, further comprising:
   displaying a gray element having red, green and blue values substantially equal to the color value of the selected green element with the display device;
   displaying a plurality of red-blue shifted gray elements having a green value substantially equal to the color value of the selected green element and red and blue values shifted from the color value of the selected green element with the display device;
   selecting one of the gray element and the plurality of red-blue shifted gray elements displayed by the display device that appears to most closely blend with a dithered gray background displayed by the display device; and
   estimating the gray balance of the display device based on the selected one of the gray element or selected red-blue shifted gray element.

7. The method of claim 6, wherein the red-blue shifted gray elements represent shifts in red, blue, or a combination of red and blue away from a color value of the gray element.

8. The method of claim 6, wherein the red-blue shifted elements do not represent any substantial shift in green away from the color value of the gray element.

9. The method of claim 1, further comprising:
estimating both the blackpoint and the gray balance of the display device; and
characterizing the colorimetric response of the display device based on the estimated gamma, values blackpoint, and gray balance.

10. The method of claim 9, wherein the display device is associated with a client residing on a computer network, the method further comprising:
transmitting information representing the estimated blackpoint, gamma, values and gray balance to a remote server on the network;
modifying the color image at the remote server based on the information; and
delivering the modified color image to the client via the computer network for display on the display device.

11. The method of claim 9, further comprising:
modifying a color image based on the estimated blackpoint, gamma, values and gray balance; and
delivering the modified color image to the display device.

12. The method of claim 1, wherein the dithered green background is a dithered approximately 33% green background.

13. The method of claim 1, wherein the display device is associated with a client on a computer network, the method further comprising guiding the client through the process of obtaining the estimated gamma by delivering one or more instructional web pages to the client.

14. A system comprising:
a web server to transmit web pages to clients residing on a computer network;
a color image server to transmit color images referenced by the web pages to the clients for display on display devices associated with the clients;
a color profile server to guide the clients through a color profiling process and obtain information characterizing the color responses of the display devices associated with the clients, wherein the information includes an estimated initial green gamma value for the display device, the initial green gamma value being determined based on selection of a display green element that appears to most closely blend with a dithered green background, estimated red and blue gamma values based on the initial green gamma value, wherein the estimated gamma values for the red and blue channels of the display device are estimated from the initial green gamma value and modified based on a gray balance evaluation for the red and blue color channels; and
one or more color correction modules to modify the color images transmitted by the color image server based on the information to improve the accuracy of the color images when displayed on the respective display device.

15. The system of claim 14, wherein the color image server stores the information to the client in a web cookie, the client transmits the web cookie from the client to the server, and the color image server modifies the color image via the server based on the contents of the web cookie.

16. The system of claim 14, wherein the color profiling process includes:
displaying a gray element having red, green and blue values substantially equal to the color value of the selected green element with the display device;
displaying a plurality of red-blue shifted gray elements having a green value substantially equal to the color value of the selected green element and red and blue values shifted from the color value of the selected green element with the display device;
estimating the gray balance of the display device by selecting one of the gray element and the plurality of red-blue shifted gray elements displayed by the display device that most closely blends with a dithered gray background displayed by the display device;
generating a color profile for the display device based on the estimated gamma values and the estimated gray balance; and
modifying the color image for the display device using the color profile.

17. The system of claim 14, wherein the color profiling process includes:
displaying a gray element having red, green and blue values substantially equal to the color value of the selected green element with the display device;
displaying a plurality of red-blue shifted gray elements having a green value substantially equal to the color value of the selected green element and red and blue values shifted from the color value of the selected green element with the display device;
selecting one of the gray element and the plurality of red-blue shifted gray elements displayed by the display device that appears to most closely blend with a dithered gray background displayed by the display device; and
estimating the gray balance of the display device based on the selected one of the selected gray element or selected red-blue shifted gray element.

18. The system of claim 17, wherein the red-blue shifted gray elements represent shifts in red, blue, or a combination of red and blue away from the color value of the gray element.

19. The system of claim 17, wherein the red-blue shifted gray elements do not represent any substantial shift in green away from the color value of the gray element.

20. The system of claim 14, wherein estimating the gamma includes:
selecting one of a first plurality of green elements displayed by the display device that appears to most closely blend with the dithered green background;
estimating a coarse gamma values for the display device based on the selected one of the first plurality of green elements;
selecting one of a second plurality of green elements displayed by the display device that appears to most closely blend with the dithered green background, wherein the second plurality of green elements includes the selected one of the first plurality of green elements; and
estimating a fine gamma values for the display device based on the selected one of the second plurality of green elements, wherein the estimated fine gamma values is the estimated gamma values.

21. The system of claim 20, wherein the first plurality of green elements represent greater gradations in green intensity than the second plurality of green elements.

22. The system of claim 14, wherein the estimated gamma values is limited to the green channel.

23. The system of claim 14, wherein the color profiling process includes:
estimating both the blackpoint and the gray balance of the display device; and characterizing the colorimetric response of the display device based on the estimated gamma, values blackpoint, and gray balance.

24. The system of claim 14, wherein the dithered green background is a dithered approximately 33% green background.

25. A computer-readable medium encoded with a computer program containing instructions to cause a programmable processor to:
   determine estimated value for a green gamma for a display device based on selection of a displayed green element that appears to most closely blend with a dithered peen backgrounds, the display device having red, blue and green color channels:
   estimate initial gamma values for the red and blue channels of the display device based on the estimated green gamma value;
   perform a gray balance evaluation for red and blue channels relative to the green channel using the estimated initial gamma values for red and blue channels; and
   modify the estimated gamma values for red and blue color channels based on the gray balance evaluation for the red and blue color channels.

26. The computer-readable medium of claim 25, wherein the instructions cause the processor to:
   modify a color image based at least in part on the estimated gamma values; and
   deliver the modified color image to the display device.

27. The computer-readable medium of claim 25, wherein the display device is associated with a client residing on a computer network, and the instructions cause the processor to:
   transmit information representing the estimated gamma values to a remote server on the network;
   modify the color image at the remote server based on the information; and
   delivery the modified color image to the client via the computer network for display on the display device.

28. The computer-readable medium of claim 25, wherein estimating the green gamma values includes:
   selecting one of a first plurality of green elements displayed by the display device that appears to most closely blend with the dithered green background;
   estimating a coarse gamma values for the display device based on the selected one of the first plurality of green elements;
   selecting one of a second plurality of green elements displayed by the display device that appears to most closely blend with the dithered green background, wherein the second plurality of green elements includes the selected one of the first plurality of green elements; and
   estimating a fine gamma values for the display device based on the selected one of the second plurality of green elements, wherein the estimated green fine gamma values is the estimated gamma values.

29. The computer-readable medium of claim 28, wherein the first plurality of green elements represent greater gradations in green intensity than the second plurality of green elements.

30. The computer-readable medium of claim 25, wherein the instructions cause the processor to:
   display a gray element having red, green and blue values substantially equal to the color value of the selected green element with the display device;
   display a plurality of red-blue shifted gray elements having a green value substantially equal to the color value of the selected green element and red and blue values shifted from the color value of the selected green element with the display device;
   select one of the gray element and the plurality of red-blue shifted gray elements displayed by the display device that appears to most closely blend with the dithered gray background displayed by the display device; and
   estimate the gray balance of the display device based on the selected one of the gray element or selected red-blue shifted gray element.

31. The computer-readable medium of claim 30, wherein the red-blue shifted gray elements represent shifts in red, blue, or a combination of red and blue away from the color value of the gray element.

32. The computer-readable medium of claim 30, wherein the red-blue shifted gray elements do not represent any substantial shift in green away from the color value of the gray element.

33. The computer-readable medium of claim 25, wherein the instructions cause the processor to:
   estimate both the blackpoint and the gray balance of the display device; and
   characterize the colorimetric response of the display device based on the estimated gamma, blackpoint, and gray balance.

34. The computer-readable medium of claim 33, wherein the display device is associated with a client residing on a computer network, and the instructions cause the processor to:
   transmit information representing the estimated blackpoint, gamma, and gray balance to a remote server on the network;
   modifying the color image at the remote server based on the information; and
   deliver the modified color image to the client via the computer network for display on the display device.

35. The computer-readable medium of claim 25, wherein the instructions cause the processor to:
   modify a color image based on the estimated blackpoint, gamma, and gray balance; and
   deliver the modified color image to the display device.

36. The computer-readable medium of claim 25, wherein the dithered green background is a dithered approximately 33% green background.

37. The computer-readable medium of claim 25, wherein the display device is associated with a client on a computer network, and the instructions cause the processor to guide the client through the process of obtaining the estimated gamma by delivering one or more instructional web pages to the client.

38. The computer-readable medium of claim 25, wherein the instructions are contained both in physical data storage media and signals transmitted between the client and other resources on the computer network.

39. The method of claim 1, wherein modifying the overall gamma includes computing individual gammas for the red, blue and green channels based on the overall gamma and the gray balance evaluation.

40. The system of claim 14, wherein the overall gamma is modified by computing individual gammas for the red, blue and green channels based on the overall gamma and the gray balance evaluation.

41. The computer-readable medium of claim 25, further comprising instructions to cause the processor to modify the overall gamma by computing individual gammas for the red, blue and green channels based on the overall gamma and the gray balance evaluation.

* * * * *

UNITED STATES PATENT AND TRADEMARK OFFICE
CERTIFICATE OF CORRECTION

PATENT NO.         : 7,119,760 B2                                    Page 1 of 1
APPLICATION NO.    : 09/778486
DATED              : October 10, 2006
INVENTOR(S)        : Christopher J. Edge et al.

It is certified that error appears in the above-identified patent and that said Letters Patent is hereby corrected as shown below:

Column 33, line 13        "peen" should read as --green--
                          "backgrounds" should read as --background--

Column33, line 44         "values" should read as --value--

Column 33, line 52        "values" should read as --value--

Column 33, line 55        "values" should read --value-- in both instances
                          After "estimated" insert --green--

Signed and Sealed this

Fourteenth Day of August, 2007

JON W. DUDAS
*Director of the United States Patent and Trademark Office*